(12) United States Patent
Sdorra et al.

(10) Patent No.: US 11,244,001 B2
(45) Date of Patent: Feb. 8, 2022

(54) METHOD FOR RETRIEVING SIMILAR VIRTUAL MATERIAL APPEARANCES

(71) Applicant: DASSAULT SYSTEMES, Velizy Villacoublay (FR)

(72) Inventors: Bastian Sdorra, Munich (DE); Holger Dammertz, Kirchseeon (DE)

(73) Assignee: DASSAULT SYSTEMES, Velizy Villacoublay (FR)

( * ) Notice: Subject to any disclaimer, the term of this patent is extended or adjusted under 35 U.S.C. 154(b) by 230 days.

(21) Appl. No.: 16/724,008

(22) Filed: Dec. 20, 2019

(65) Prior Publication Data
US 2020/0201900 A1    Jun. 25, 2020

(30) Foreign Application Priority Data
Dec. 21, 2018    (EP) ..................................... 18306785

(51) Int. Cl.
| | |
|---|---|
| *G06K 9/46* | (2006.01) |
| *G06F 16/583* | (2019.01) |
| *G06K 9/62* | (2006.01) |

(52) U.S. Cl.
CPC ....... *G06F 16/5838* (2019.01); *G06K 9/4652* (2013.01); *G06K 9/4661* (2013.01); *G06K 9/6215* (2013.01); *G06K 2209/19* (2013.01)

(58) Field of Classification Search
CPC ............ G06F 16/5838; G06F 16/5862; G06K 9/4652; G06K 9/4661; G06K 9/6215;
(Continued)

(56) References Cited

U.S. PATENT DOCUMENTS 8,243,071 B2 * 8/2012 Wang ...................... G06T 15/50
                                                              382/108
9,818,224 B1 * 11/2017 Worley ................ H04N 13/275
(Continued)

OTHER PUBLICATIONS

Motofumi T. Suzuki, et al.; "Personalized Retrieval from Material Color Databases for 3D Polygonal Models"; Proc. of 6th International Conference on Virtual Systems and Multimedia (VSMM 2000); XP055594366; Retrieved From the Internet: URL:https://pdfs.semanticsholar.org/0302/8c232868155acac6b689d086o-480bcboBa1c.pdf [retrueved ib Hyb, 5, 2019]; 8 pgs.

(Continued)

*Primary Examiner* — Duy M Dang
(74) *Attorney, Agent, or Firm* — Oblon, McClelland, Maier & Neustadt, L.L.P.

(57) ABSTRACT

The disclosure notably relates to a computer-implemented method for retrieving a similar virtual material appearance from a database. The method comprises providing a database including virtual material appearances associated to an appearance signatures computed from values representing at least one of a structure, a reflection and a color of the associated virtual material appearance. The method further comprises providing a first appearance signature associated to a first virtual material appearance. The method further comprises identifying one or more virtual material appearances similar to the first virtual material appearance by comparing the first appearance signature with appearance signatures respectively associated to virtual material appearances in the database. The method improves retrieval of virtual material appearances.

14 Claims, 18 Drawing Sheets

(58) Field of Classification Search
CPC .............. G06K 2209/19; G06K 9/4642; G06K 9/6212; G06K 9/6267; G06T 7/90
See application file for complete search history.

(56) References Cited

U.S. PATENT DOCUMENTS

| | | | |
|---|---|---|---|
| 2009/0046099 A1* | 2/2009 | Duca | G06T 15/50 345/426 |
| 2015/0070703 A1* | 3/2015 | Tin | B07C 5/342 356/445 |

OTHER PUBLICATIONS

Wenbin Li, et al.; "Recognizing Materials from Virtual Examples"; Computer Vision ECCV 2012; Springer Berlin Heidelberg, XP047018751; ISBN: 978-3-642-33764-2; Oct. 7, 2012; 14 pgs.

S. Battiato, et al.; "Perceptive Visual Texture Classification and Retrieval"; Image Analysis and Processing; 2003; Proceedings 12$^{th}$ International Conference on Sep. 17-19, 2003; Piscataway, NJ, USA; ISBN: 978-8-7695-1948-7; 6 pgs.

Edward H. Adelson; "On Seeing Stuff: The Perception of Materials by Humans and Machines"; Proceedings fo the SPIE; vol. 4299, Human Vision and Electronic Imaging Vl. 2001; 13 pgs.

Michael Ashikhmin, et al.; "An Anisotropic Phong BRDF Model"; Journal of Graphic Tools; 200; Abstract Only, 4 pgs.

Joan Bruna, et al.; "Classification with scattering Operators"; Proceedings of the IEEE Computer Society Conference on Computer Vision and Pattern Recognition; 2011; 6 pgs.

Brent Burley and Walt Disney Animation Studies; 2012; "Physically-Based Shading ad Disney"; ACM SIGGRAPH; 26 pgs.

"Industrial Comour-Difference Evaluation"; CIE Pub., Vienna; CIE Central Bureau; 1995; Abstract Only; 3 pgs.

Andrew S. Glassner; "Principles of Digital Image Synthesis"; Morgan Kaufmann Publishers Inc.; San Francisco; 1995; Abstract Only; 6 pgs.

Dedre Gentner, et al.; "Structure Mapping in Analogy and Similarity"; American Psychologist; Jan. 1997; 12 pgs.

David K. Mcallister, et al.; "Efficient Rendering of Spatia; Bi-Directional Reflectance Distribution Functions"; Proceedings of the ACM SIGGRAPH/Eurographics Conference on Graphics Hardware; Sep. 2002; Abstract Only; 4 pgs.

Wojciech Matusik, et al.; "Efficient Isoptropic BRDF Measurement"; EGRW'03 Proceedingsof the 14$^{th}$ Eurographics Workshop on Rendering; 2003; 9 pgs.

Shervin Minaee, et al.; "Iris Recognition Using Scattering Transform and Textural Features"; 2015 IEEE Signal Processing and Signal Processing Education Workshop, SP/SPE; 6 pgs.

Jannik B. Nielsen, et al.; "On Optimal, Minimal BRDF Sampling for Reflectance Acquisition"; ACM Transactions on Graphics; 2015; 11 pgs.

Matt Pharr, et al.; "Physically Based Rendering (Second Edition)"; Published Jul. 12, 2010; Abstract Only; 4 pgs.

Roger N. Shepard, "The Analysis of Proximities: Multidimensional Scaling with an Unknown Distance Function. 1";Psychometrika; Jun. 1962; Abstract Only; 6 pgs.

Lavanya Sharan, et al.; "Recognition Materials Using Perceptually Inspired Features"; International Journal of Computer Vision; Jul. 1, 2013; Abstract Only; 2 pgs.

Laurent Sifre, et al.; "Combined Scattering for Rotation Invariant Texture Analysis"; ESANN 2012 Proceedings, European Symposium on Artificial Neural Networks; Computational Intelligence and Machine Learning; Apr. 25-27, 2012; 6 pgs.

Lavanya Sharan, et al.; "Accuracy and Speed of Material Categorization in Real-World Images"; Journal of Vision 14; Aug. 2014; 13 pgs.

Amos Tversky; "Features of Similarity"; Psychological Review by the American Psychological Association, Inc.; vol. 84; No. 4; Jul. 1977; 26 pgs.

Extended Search Report dated Aug. 19, 2019 in Europe Application No. 18306785.9-1217; 10 pgs.

\* cited by examiner

METHOD FOR RETRIEVING SIMILAR VIRTUAL MATERIAL APPEARANCES

CROSS-REFERENCE TO RELATED APPLICATIONS

This application claims priority under 35 U.S.C. § 119 or 365 to European Application No. 18306785.9, filed Dec. 21, 2018. The entire contents of the above application(s) are incorporated herein by reference.

FIELD OF THE INVENTION

The disclosure relates to the field of computer programs and systems, and more specifically to a method, system and program for retrieving similar virtual material appearances from a database.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In computer vision, the classification of materials based on their appearance is an important discipline in the context of object recognition from images. Techniques of digital image synthesis use virtual objects in combination with virtual materials to create an accurate virtual representation for real objects. For instance, the virtual object represents an object of the real world such a part of a mechanical system and the virtual material of the virtual object may represent a metal the real-world object is made of. A virtual material is a dataset which in some way represents properties of an object. These properties are related to different attributes of the material, for example the mechanical behavior, the chemical composition and/or the visual appearance. The appearance part of the virtual material is a data subset which parameterizes the interaction of light with an object's surface. This comprises how light reflects, refracts from the surface or scatters inside/beneath the surface.

When creating an object, a user that is designing the object may retrieve from an existing database one or more virtual material appearances which are used when rendering the object. The user may also want to test different virtual material appearances which have a similar appearance, in other words virtual materials which are share visual characteristics. This allows a user, for example, to select the most appropriate virtual material appearance or the virtual material appearance which consumes the least amount of computing resources during rendering.

Typically, the different virtual material appearances are visually assessed by the user. The appearance of the rendered object is perceived differently depending on the environment it is observed from. For example, an object being rendered with a virtual material appearance of shiny chrome, mirrors its environment. The appearance of an object using such a virtual material appearance is perceived differently depending on its surroundings. In an extreme case of a diffuse white environment the same rendered object doesn't look shiny at all, it just appears diffuse white. The dependency on external conditions makes it difficult to compare the appearance of different virtual materials between them.

The representation of the virtual properties and features of a material cannot be as cleanly separated as for physical materials. Physical materials can be sensed through touch and other human senses other than vision which helps untangle the features characterizing appearance, however this is not possible for virtual materials. As discussed by Adelson at al. in "*On seeing stuff: the perception of materials by humans and machines*", 2001, untangling these factors from just a single 2D image is complex. This makes the comparison between appearances of virtual materials complex.

There is no standardized appearance data model for virtual materials which makes it hard to retrieve different virtual material appearances. The different data models describe different aspects of the appearance and often cannot be directly compared. This further increases the difficulty when comparing the appearance of different virtual materials, let alone identifying similar virtual material appearances.

The concept of similarity is omnipresent in science. In mathematics, geometric similarity is used to describe the similarity relations between geometric shapes. Graph theoretic similarity techniques are used for semantic analysis of ontologies in areas such as linguistics and information science. The ability to calculate the similarity of pairs of proteins is an essential tool for DNA analysis in molecular biology. All these similarity measures share a common characteristic: the input data is clearly defined. By knowing the structure and semantics of the input data, it is possible to mathematically define a so-called similarity space, a space which can be used to express objects in terms of their features of interest and then extract the similarity as simple geometric distance of their projected coordinates.

The concept of similarities plays an important role in artificial intelligence. Machine learning techniques start to penetrate ail of disciplines. In times of cloud-based user platforms and big-data intelligent algorithms are vital to make sense of all the information. Establishing similarity relations between objects helps these techniques to understand complex, non-obvious data relations.

Currently there are no methods which enable a user to retrieve in a database a virtual material appearance similar to another virtual material appearance. Within this context, there is still a need for an improved method to compare virtual material appearances, and to retrieve virtual material appearance(s) from a database that is (are) similar to a virtual material appearance.

SUMMARY OF THE INVENTION

It is therefore provided a computer-implemented method for retrieving a virtual material appearance from a database, the method comprising:
  providing a database including virtual material appearances, each virtual material appearance being associated to an appearance signature computed from values representing at least one of a structure, a reflection and a color of the associated virtual material appearance;
  providing a first appearance signature associated to a first virtual material appearance;
  identifying in the database one or more virtual material appearances similar to the first virtual material appearance by comparing the first appearance signature with appearance signatures respectively associated to virtual material appearances in the database.

The method may comprise one or more of the following:
  the values represent at least one of the structure, the reflection and the color of the associated virtual material appearance are computed from a representation of the said associated virtual material appearance;
  weighting the first appearance signature;
  weighting the first appearance signature comprises weighting the values representing the at least one of the structure, the reflection and the color of the virtual material appearances associated to the first appearance signature and each compared appearance signature;
  computing the value of the color comprises determining a value $\Delta E_{ab}$, given by:

$$\Delta E_{ab} = \sqrt{(L_2-L_1)^2+(a_2-a_1)^2+(b_2-b_1)^2}$$

where:
  1 and 2 correspond to indexes relative to two colors;
  L corresponds to the Lightness; and
  a and b correspond to green-red, blue-yellow color components respectively;
  computing the value of the reflection by computing a Bi-Directional Reflection Distribution Function (BRDF) from the representation of the associated virtual material appearance;
  computing the BRDF further comprises computing multiple angular evaluations of the BRDF on the representation of the associated virtual material appearance, in a parametrized space with an illumination having a spatially uniform neutral light;
  the illumination further includes a frequency component;
  computing the value of the structure by:
    sampling a virtual measure plane of the representation of the associated virtual material appearance, with a lighting having spatially uniform neutral light; and
    evaluating a hemispherical integral of reflected light of the lighting by each sample;
  computing an appearance signature further comprises reducing the dimensions of the appearance signature;
  reducing the dimensions of the appearance signature further comprises:
    performing a principal component analysis (PCA) on values respectively representing at least one of structure, reflection and color of associated virtual material appearances of the database;
    obtaining a number of basis vectors resulting from the PCA; and
    reducing the number of computed values using the number of basis vectors; and/or
  the first appearance signature is computed from a reduced number of values representing at least one of the structure, the reflection and the color of the first virtual material appearance.

It is further provided a computer program comprising instructions for performing the method.

It is further provided a computer readable storage medium having recorded thereon the computer program.

It is further provided a database including virtual material appearances on which the method can be performed.

It is further provided a system comprising a processor coupled to a memory and a graphical user interface, the memory having recorded thereon the computer program.

BRIEF DESCRIPTION OF THE DRAWINGS

Embodiments of the disclosure will now be described, by way of non-limiting example, and in reference to the accompanying drawings, where.

DETAILED DESCRIPTION OF THE INVENTION

Figure 1:
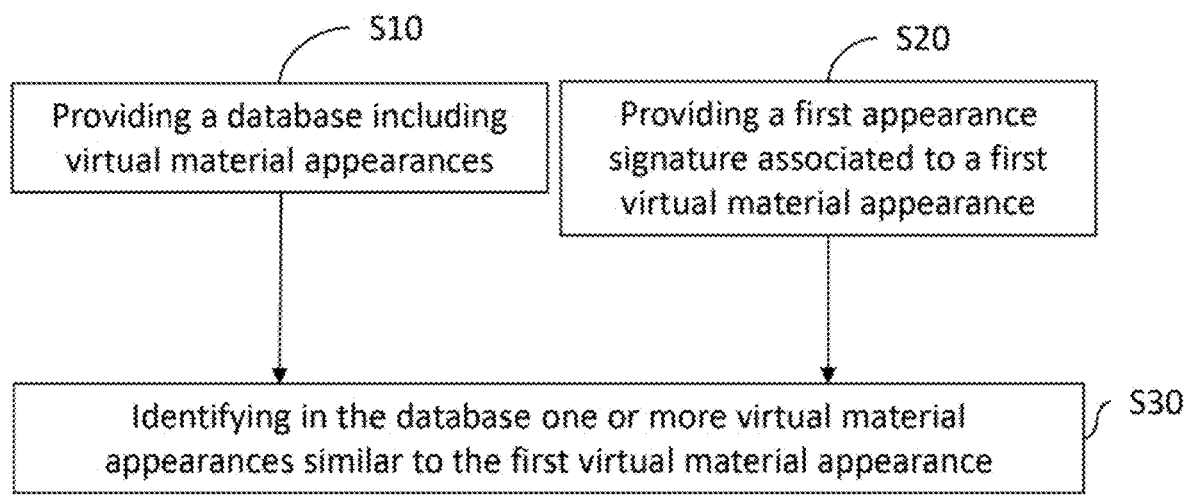
FIG. 1 shows a flowchart of an example of the method.

With reference to the flowchart of FIG. 1, it is proposed a computer-implemented method for retrieving a virtual material appearance from a database. The method comprises providing a database which includes virtual material appearances. The virtual material appearances in the database are associated to an appearance signature. The term "associated to" means that the two objects are related and have a relation in the database, that is they have a close connection, e.g. there is a mutual link between two objects. Thus, the appearance signature is also associated to the virtual material appearance, for example in the form of an attribute and/or through a pointer. Each appearance signature is computed from values representing at least one of structure, reflection and color of the corresponding virtual material appearance which is associated with a corresponding appearance signature. The method further comprises providing a first appearance signature associated to a first virtual material appearance. The method further comprises identifying in the database one or more virtual material appearances similar to the first virtual appearance. The identification is performed by comparing the first appearance signature with other appearance signatures, each of the other appearance signatures being associated to one virtual material appearance in the database.

Such a method improves the comparison of virtual material appearances, and the retrieval from a database of virtual material appearance(s) that are similar to a given virtual material appearance.

Notably, the appearance signatures in the method enable a deterministic evaluation of the similarity between two virtual material appearances. In other words, the appearance signatures allow giving of a degree of similarity of the visual appearance provided by the virtual material appearances. Indeed, the appearance signature includes values which represent at least one of three significant features characterizing the appearance of virtual materials: color, reflection and texture. The appearance signature thus enables comparisons based on numerical values between two virtual material appearances. The method enables identification of one or more virtual material appearances in a database which are similar to a first virtual material appearance. The identified one or more similar virtual material appearances may be returned to a user, for example as a list and/or as predefined thumbnails rendered with the one or more similar virtual material appearances. Thus, the method facilitates the use of virtual material appearances by assisting the user in identifying alternative virtual material appearances which are similar to a known virtual material appearance.

In examples, virtual material appearances are used when designing a scene. An object in the scene is perceived by a user in a manner which depends on the scene. The object is a virtual object (e.g. a modeled object) as it is a representation of an object in a virtual scene. In examples, the object in the scene represents a real-world object, thus the appearance of the object in the scene mimics that of the real-world object. In other words, the color, texture and light reflections on the object in the scene, which are defined by the virtual material appearance of the object in the scene, mimics that of the real-world object. When designing a scene, a user may want to apply different virtual material appearances to objects in the scene which should be visually similar, for example objects modeling a chair or a table made from different types of wood or metal parts of a same vehicle made from different metals. The method allows the user to rapidly identify alternatives virtual materials from a database, which removes the need to manually go through many virtual material appearances stored, therefore improving the efficiency of the user. Furthermore, the amount of computing resources involved when rendering a scene depends on the objects in the scene, and the amount of computing resources involved when rendering an object in the scene depends on the virtual material appearance of the object. Identifying similar virtual material appearances facilitates selection of one or more virtual material appearances which, when rendered, look alike but need different amounts of computing resources.

In examples, the values representing at least one of structure, reflection and color, from which an appearance signature is computed, are themselves computed from a representation of a virtual material appearance associated to the appearance signature. The virtual material appearance may be any provided virtual material appearance, including the first virtual material appearance and/or a virtual material appearance in the database. The computation of the values representing at least one of the structure, the reflection and the color may include extracting said values from the representation of the virtual material appearance. The representation of the virtual material appearance may be computed by the system and may result from at least part of a rendering. Thus, the method is applicable to visual material appearances having different appearance models. The method effectively allows bypassing of the problem of appearance data model fragmentation and can be performed with different appearance models.

In examples, the computation of the representation of the virtual material appearance includes light transport simulation. Thus, the simulated light transport may change to increase the precision of a computed value representing at least one of structure, reflection and color as needed.

In examples, the first appearance signature is weighted. For example, by adding a weight to the first appearance signature, or alternatively by adding weights to parts of the first appearance signature. When the first appearance signature is compared with other appearance signatures, the comparison takes into account the weights of the first appearance signature. In examples an independent weight is added to each part of the first appearance signature which is computed from values representing the structure, the reflection and/or the color of the first virtual material appearance. The identified virtual material appearances share a similarity with respect to the structure, the reflection or the color of the first virtual material appearance depending on the weights. Thus, the precision of the identification of similar virtual material appearances in the database increases as it better reflects what type of virtual material appearances a user wants to identify.

In examples, the computed values representing at least one of structure, reflection and color are compressed, for example by only keeping significant values. The appearance signature computed from the compressed values has a size in memory which occupies little space. In examples the appearance signature may have more than 20 values and less than 100 values, for example 40 values. The compression and/or data reduction process for the values representing at least one of structure, reflection and color are configured to preserve the quality of the similarity when comparing appearance signatures. Thus, the appearance signature is adapted for rapid and efficient computer operations since its small size requires few computing resources to process.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

In the case of the method, the database comprises virtual material appearances. The database may further comprise appearance signatures. Each appearance signature is associated to a corresponding virtual material appearance in the database.

In examples, data on the first virtual material appearance may be included when performing a query on the database, for example the associated appearance signature may be included in the query. The identified virtual material appearances may be returned to a user or to an application following the query. Performing the method through a query may thus make full use of the database structure to optimize the identification of virtual material appearances according to the method.

The method may be implemented in a system or part of a system. The system may be a CAD system, a CAE system, a CAM system, a PDM system and/or a PLM system, or even a combination of two or more of these systems.

The method may be part of designing a scene or an object in the scene. The scene and the object may be three-dimensional. The object may be a modeled object, that is an object defined by data stored, e.g. in the database.

In an example the method may comprise providing a first modeled object, the modeled object including a first virtual material appearance. The first virtual material appearance is identified by the system, in other words operations which take as an input the first virtual appearance can be performed. The method further comprises identifying a first appearance signature associated with the first virtual material appearance. Identifying may include computing the first virtual material appearance according to the method if no appearance signature is associated with the first virtual material appearance. The method further comprises identifying in a database or in non-volatile memory one or more stored virtual material appearances similar to the first virtual material appearance according to the method. The method may further comprise in providing a list of the identified virtual material appearances. Alternatively or additionally one or more representations of the object with an identified virtual material appearance may be provided to the user. The method thus improves the design of a modeled object and or a scene.

The design process may be performed in a CAD system. By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semi-conductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A CAD system may be history-based. In this case, a modeled object is further defined by data comprising a history of geometrical features. A modeled object may indeed be designed by a physical person (i.e. the designer/ user) using standard modeling features (e.g. extrude, revolute, cut, and/or round) and/or standard surfacing features (e.g. sweep, blend, loft, fill, deform, and/or smoothing). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (e.g. a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed of a plurality of components from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 2:
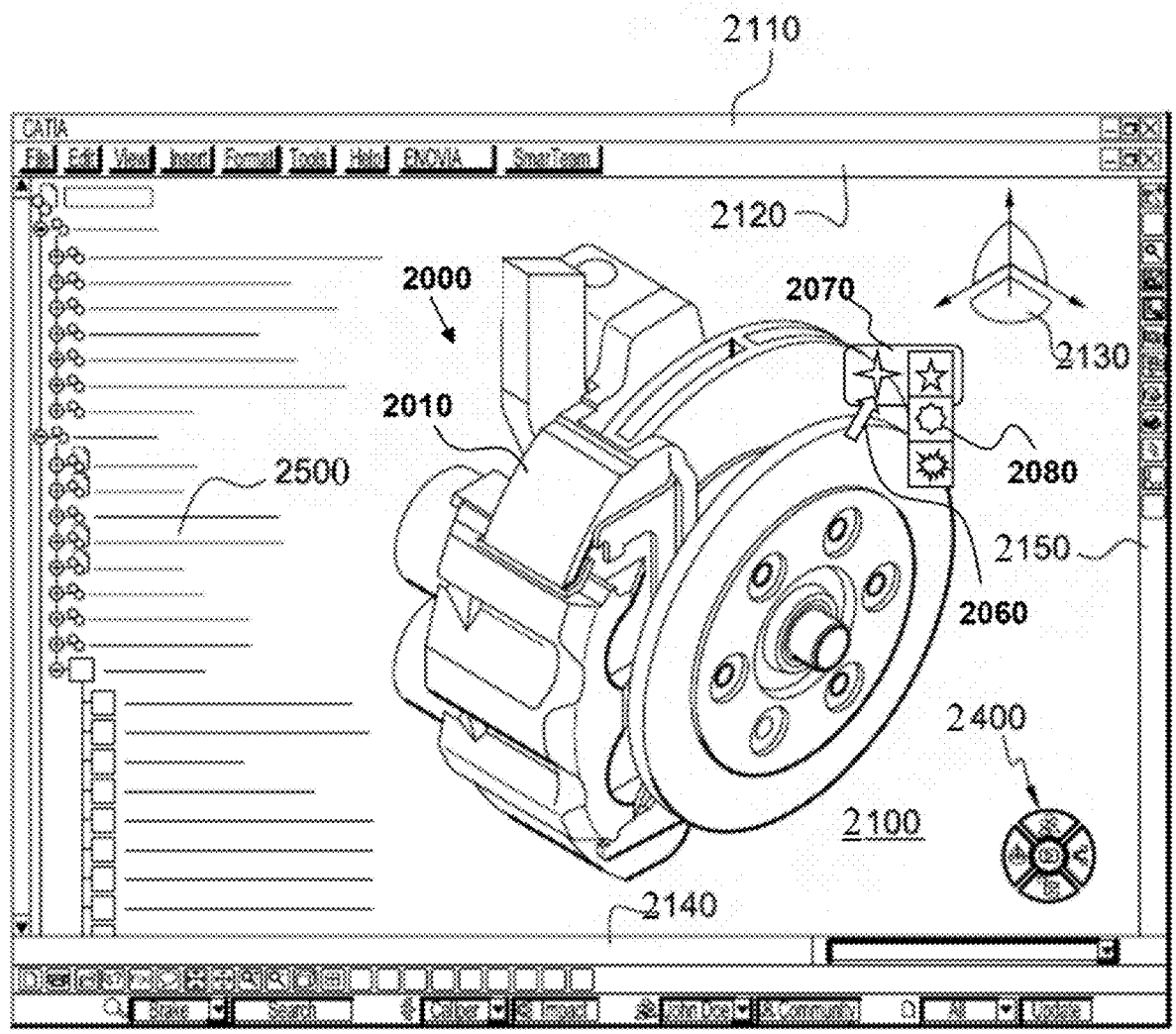
FIG. 2 shows an example of a graphical user interface of the system.

FIG. 2 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
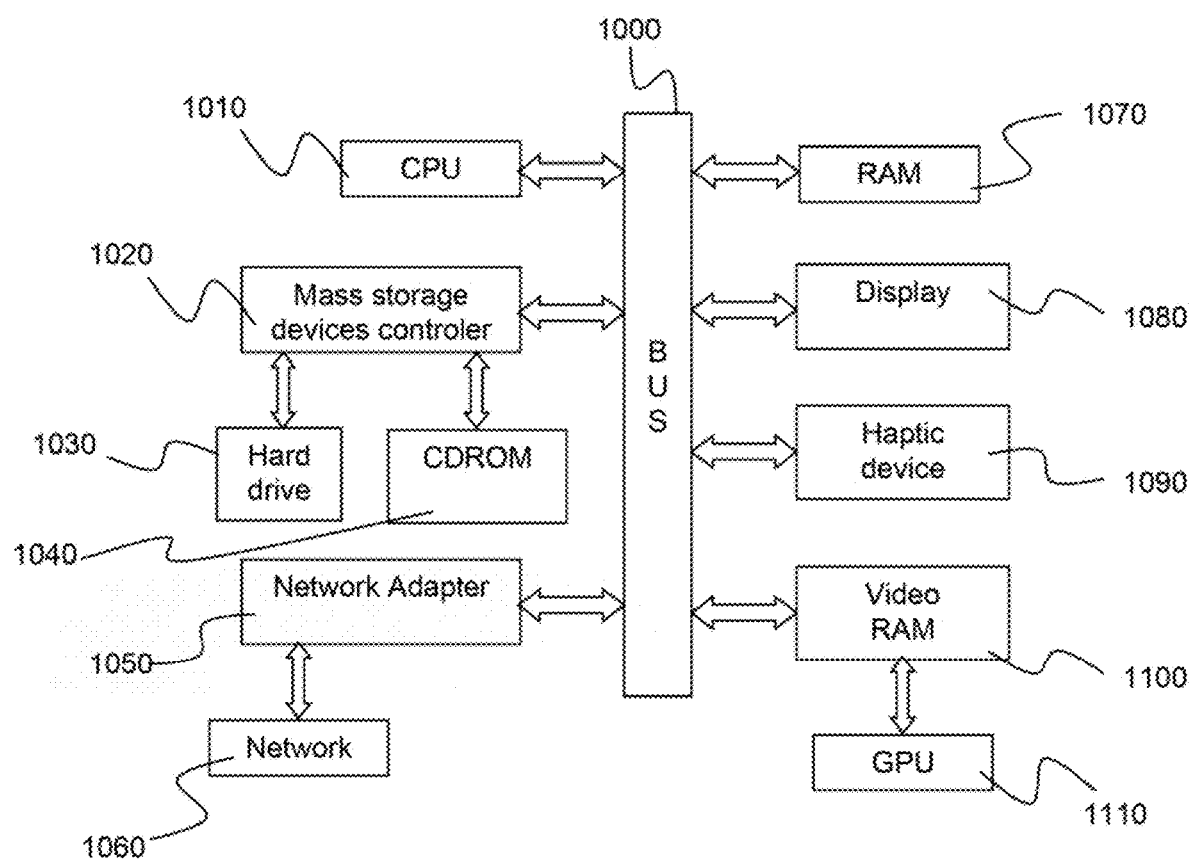
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means far causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

A virtual material is a material of the real world modeled by data. A material of the real world (also referred to as physical material) is a chemical substance or mixture of substances that constitute an object. A physical material is produced with a manufacturing process. A material of the real word may be a metallic material, a composite material, an organic material, a mineral material. In practice, a material of the real world is used in at least one of the industries previously discussed in relation to CAD system. For the sake of exemplify only, a material of the real world may be, but not limited to, plastic, bio-based material, carbon-based material, cellulose fiber, cork, cross-laminate, ebonite, FDU materials, fiber, gemstone, glass microsphere, hybrid wood, metal, latex, mesoporous material, microporous material, mineral wool, nanophase ceramic, paper, silicon nanowire, wood, . . . . The data of the virtual material comprises data describing the physical aspect of the virtual material and data describing the visual aspect of the virtual material. The data describing the physical aspect includes information describing how the material interacts physically with other objects. For example, the physical aspect may comprise roughness parameters, e.g. amplitude parameters, slope, spacing, and counting parameters, . . . as known in the art. The data describing the visual aspect may comprise one or more datafiles, including a datafile describing the appearance of the virtual material. The appearance is an analytical representation of the reflection properties of a material and describes how light interacts with the material at a surface level. A virtual material appearance is thus data (e.g. in the form of a datafile stored in computer memory) comprising information on the appearance of the virtual material. The specific information in the virtual material appearance depends on the data model of the virtual material appearance. For example, the virtual material appearances exist as datafiles separate from the modeled objects on which they may be applied to.

In examples, the virtual material appearance does not include information on the physical aspect of the visual material. When rendering a modeled object on which a virtual material appearance is applied to, the modeled object will interact with light and will have physical properties defined by the virtual material appearance. For example, a rendered modeled object on which a shiny chrome virtual material appearance is applied to will have a metallic luster simulating the look of polished chrome.

In the following, the term "virtual material appearance" excludes non appearance related properties.

The method of FIG. 1 is now discussed in more detail.

The method is for retrieving a virtual material appearance from a database. The database may be a relational database. Alternatively or additionally, the database may be a non-volatile memory storage. The method comprises providing (S10) a database which includes virtual material appearances (e.g. stored in the database). The virtual material appearances stored in the database are associated to appearance signatures. One appearance signature is associated to one virtual material appearance. An appearance signature is computed from values representing at least one of a structure, a reflection and a color of the virtual material appearance associated to the appearance signature. The method further comprises providing (S20) a first appearance signature associated to a first virtual material appearance. The first virtual material appearance may be a virtual material appearance stored in the database or stored elsewhere accessible by the system. The method further comprises identifying in the database one or more virtual material appearances similar to the first virtual material appearance. The identification is performed by comparing the first appearance signature with appearance signatures respectively associated to virtual material appearances in the database.

Alternatively, a first material appearance may be provided at S20 instead of a first appearance signature. In this case, the method then further comprises identifying a first appearance signature associated with the first virtual material appearance. If no appearance signature is associated to the first visual material appearance, the method further comprises computing a first virtual material appearance signature associated with the first visual material appearance. The provided first virtual material appearance can be stored in non-volatile computer memory for future uses.

Each virtual material appearance in the database is associated to an appearance signature. The appearance signature is a unique identifier for a given virtual material appearance and includes information on features of the virtual material appearance. The appearance signature can be used as an input for a database indexer. The appearance signature is computed from values representing at least one of an appearance features such as reflection, structure and color of the virtual material appearance. A value representing an appearance feature may be a value quantifying said feature. The values may be numerical values. The values may be included in the appearance signature. The term "quantifying" means an information which can be ordered on a scale in a deterministic manner, such as a numerical value ordered in a numerical scale (e.g. with the help of an axis system).

The values quantifying the appearance features may be ordered in respective feature spaces which allows for an analytic assessment of similarity, for example based on the differences between the values for each respective feature space. The combined values quantifying the different appearance features, thus allow an analytic assessment of similarity between virtual materials appearances. The appearance signature is computed from values representing at least one of reflection, structure and color but may additionally also be computed from other features related to appearance of the virtual material appearance.

In examples, the appearance signature may be a vector comprising a concatenation of values representing one or more features of the virtual material appearance. The values representing the features may include numerical values in the form of numbers, vectors and/or matrices.

At S30 one or more virtual material appearances, which are similar to the first virtual material appearance, are identified in the database. The identified virtual material appearances share similarity with the first virtual material appearance for at least one of the features quantified by the appearance signature. This similarity can thus be deterministically evaluated when comparing two appearance signatures, such as the first appearance signature and an appearance signature associated with a virtual material appearance in the database.

The comparison between two appearance signatures may be performed by measuring a distance between the two appearance signatures using a metric. The metric may be a Euclidian metric such as a scalar product. This allows the distance calculation to be simple and worked well during tests of the method. Alternatively, measuring the distance may be performed with a cosine distance metric or a Manhattan distance metric.

In examples, the similarity is assessed based on the distance between virtual material appearances in a similarity space. The similarity space comprises a set of axes for at least one of reflection, structure and color. Additionally, the similarity space may also have other axes for other appearance features. The appearance signature allows virtual materials to be placed within the similarity space based on the values representing the features, for example in the form of coordinates for a feature axis. The similarity may then be measured with a metric.

In examples, the comparison between two virtual material appearances is performed via a similarity metric. The similarity metric may be defined as the inverse of the sum over the features of the distance between values of the two compared appearance signatures quantifying a same feature. This example is illustrated below with equations 1 and 2:

$$s(m_1, m_2) = 1 - \Sigma_a \delta_a(m_{1a}, m_{2a}) \quad (1)$$

$$\delta(x, y) = \|y - y\|_2 \quad (2)$$

Where:
$s(m_1, m_2)$ is the similarity metric between appearance signatures $m_1$ and $m_2$;
a is an appearance feature quantified by values $m_{1a}$ and $m_{2a}$;
$\delta$ is a distance metric;
$m_{1a}$ and $m_{2a}$ are values quantifying feature a for the appearance signatures $m_1$ and $m_2$; and
x and y are values.

The appearance signature takes into account perception of the observed appearance for assessing similarity. This is reflected by the quantification of at least one appearance feature among a structure, a reflection and a color of the associated virtual material appearance. This allows the comparison between appearance signatures to objectively quantify how similar two virtual material appearances are.

In examples the appearance signature quantifies at least two features among structure, reflection and color of the virtual material appearance associated to the appearance signature. This results in a more precise similarity comparison between the virtual material appearances considered by the method.

In examples, the appearance signature quantifies structure, reflection and color of the virtual material appearance associated to the appearance signature, resulting in an extensive description of the virtual material appearance by the appearance signature.

In examples, the one or more identified virtual material appearances may be presented to the user as a list. The list may be an ordered list, for example from the most similar virtual material appearance to the least similar virtual material appearance. In examples the identified virtual material appearances may be returned to the user.

In examples, a representation of the identified virtual material appearances may be returned to the user, such as an image or a modeled object on which the virtual material appearance is applied.

In examples, the number of virtual material appearances identified may be predetermined. Alternatively or additionally, a virtual material appearance may be identified only if the comparison between the appearance signatures is above a predetermined threshold, for example if the similarity metric shows a similarity above 10% or 20%. This allows identifying a variety of similar virtual material appearances, e.g. a designer that is looking for a similar virtual material appearance can choose one or more of the virtual appearance material identified in the database. The list may also include additional information on the similar virtual material appearances. The threshold may be configured by the designer in order to increase or decrease the number of identified virtual appearances. In a use case, if the number of identified virtual appearances is too low, the threshold is decreased. Inversely, if the number of identified virtual appearances is too high, the threshold is increased.

The method may also comprise synthesizing a virtual material appearance to compute values representing one or more features of the virtual material appearance. The computed values may be values representing at least one of structure, reflection and color of the virtual material appearance. Synthesizing a virtual material appearance refers to computing a representation of the virtual material appearance, the representation being stored in computer memory (e.g. volatile and/or non-volatile memory). In examples, synthesizing the visual material appearance includes fully rendering the virtual material appearance. Alternatively, synthesizing the virtual material appearance may include an incomplete rendering, where some rendering steps are performed without necessarily completing all the steps to fully render the virtual material appearance. Incomplete rendering is also referred to as virtual rendering.

The rendering of the virtual material appearance comprises computing the information describing the behavior of the virtual material in interaction with a light source. This computed information may be used in the computation of the appearance signature associated to the virtual material appearance. This allows bypassing of model fragmentation of different virtual material appearances, in other words incompatibilities due to differences in the data of the different virtual material appearances. As such, the computed representation of the virtual material appearance allows to effectively extract appearance features in a consistent manner between two different rendering appearances created through different models in order to compare different virtual material appearances regardless of their appearance data model.

In examples, a different representation of the virtual material appearance is synthesized to compute values for each one of structure, reflection and color. For example, a first representation may be synthesized for computing values representing reflection and a second representation for computing values representing texture. This results in a more customized computation of values representing features of the virtual material appearance as each representation may be configured for the computation of values for a respective feature. Alternatively, from one representation, values representing one or more of structure, reflection and color of the virtual material appearance corresponding to said one representation may be computed. This allows reuse of the representation without having to re-synthesize it, thus saving computing resources when performing the method.

In examples, synthesizing a representation of a first visual material appearance includes performing one or more or all rendering steps with a physically-based render engine. A representation synthesized by the physically-based render engine is referred to as a physically-based representation. The appearance data of virtual material appearances is adapted as input for a physically-based rendering system in order to produce a valid output. Physically-based image synthesis is used in areas such as visual effects (VFX), industrial visualization and also games, and comprises fast rendering techniques and highly realistic analytic materials models. Physically-based render engine makes use of physics to render an object. The physical basis imposes a certain rule-set on the computation of the relevant data from the appearance models. These rules make sure that computations do not violate laws of physics. In example, the appearance models should not reflect more energy as they receive (energy conservation). Such rules allow for predictable and intuitive results. This is particular useful to make assumptions on cross-renderer validity of results as different renderers following the same rules are more likely to produce similar results. Further, a performance optimized analytical version of such a physically-based appearance model is used. Such a model minimizes computational effort while maximizing visual fidelity.

In examples, computing an appearance signature may be performed after identifying that a respective virtual material appearance is not associated with a respective appearance signature. Alternatively, the computation of an appearance signature may be triggered by a user.

In examples, the computation of an appearance signature comprises computing a representation (e.g. physically-based representation) of the respective virtual material appearance. A set of values for the at least one of the structure, the reflection and the color of the respective virtual material appearance are computed from the representation. A respective appearance signature is then computed from the computed values. In examples, the respective appearance signature is computed by combining the computed values, for example by concatenating the respective values (e.g. forming a vector with the computed values). Alternatively or additionally, further operations may be performed on the computed values before computation of the respective appearance signature. The computed respective appearance signature is then associated to the respective virtual material appearance.

In examples, the computation of an appearance signature may be automatically performed before the identification (S30) of one or more similar virtual material appearances, when a first virtual material appearance is provided which is not associated with a first virtual material appearance. In examples, the computation of an appearance signature may be performed on a virtual material appearance to be added to the database. This allows the identification of similar virtual material appearances to be independent of the virtual material appearance model.

The method may further comprise weighting the first appearance signature. The weighting comprises association weights to the first appearance signature and may be performed before the comparison between appearance signatures at step S30. The weights may be values which enable one or more specific features of the appearance signature to be considered over other features when evaluating similarity. Thus, a user can better direct the identification of similar virtual material appearances in the database. In examples, the weights have an effect on both the first appearance signature and the appearance signature involved in the comparison.

Weighting the first appearance signatures may further comprise associating weight parameters to the values quantifying a feature, such as the structure, the reflection and the color of the virtual material appearances associated to the appearance signatures compared at S30. Each feature has an independent weight so the identification at S30 can be more selective. This allows a finer retrieval as the identified material appearance is similar in a specific feature of interest to a user. In examples, the weights are set by a user before comparing the appearance signatures at S30.

In examples, a weighted similarity metric noted $S_w$ is used for performing the comparison between appearance signatures as illustrated by the following equation 3:

$$S_w(m_1,m_2)=1-\Sigma_a w_a \delta_a(m_{1a},m_{2a}) \qquad (3)$$

Where $w_a$ is the weight associated to feature a. The other parameters of equation 3 are the same as those discussed in reference to equations 1 and 2.

In examples, the weight parameters may be directly applied to the quantified values. In this case a normalization (and optionally a linearization) may be performed on the different feature spaces based on the range on which the values vary on a respective feature space. The values correspond to the values of all the appearance signatures associated to the virtual material appearances stored in the database. The scale corresponding to two feature spaces may be different. For example, the range between a largest value and a smallest value for all appearance signatures associated to visual material appearances in the database for color may be different than for structure. The same counts for the distribution of distances between all appearances in the full dataset. In examples, structure weight may vary between 0 and 1, however, a majority of materials (e.g. 90%) are close in the structure feature space. In such a case, most of the search result variation happens in a small value range (e.g. 10% of the total range, for example between 0 and 0.1). In such a case the normalization and linearization of the feature space allows a linear weight spread between 0 to 1. Normalizing and linearizing the feature spaces allows two features with weights having the same value to be equally considered when comparing the appearance signatures. This facilitates the management of weights by a user.

The method may further comprise determining a value $\Delta E_{ab}$ when computing the value representing the color of the virtual material appearance. The value $\Delta E_{ab}$ is a distance metric for color difference. In examples the distance metric from color may be the distance metric introduced by the international Commission on illumination (CIE) which is a metric for color difference in the context of human sensation. This results in this particular metric being well adapted to quantifying appearance. In its basic version, $\Delta E_{ab}$, is the Euclidean distance of two colors in CIELAB color space as shown in equation 4:

$$\Delta E_{ab} = \sqrt{(L_2-L_1)^2+(a_2-a_1)^2+(b_2-b_1)^2} \quad (4)$$

Where:
1 and 2 correspond to indexes relative to two colors of the virtual material appearance;
L corresponds to the Lightness; and
a and b correspond to Green-red, blue-yellow color components respectively.

In examples, the value representing the color of the virtual material appearance is a three component CIELAB mean color of the virtual material appearance.

In examples, the color is computed from the representation of the virtual material appearance, in examples, the computation of the color is performed with a uniform neutral environment lighting.

The computation of values representing reflection of a virtual material appearance may be performed by a Bi-Directional Reflection Distribution Function (BRDF) from the representation of the virtual material appearance. The BRDF is a 4-dimensional function which describes how much of the incoming light at a specific position is reflected in a certain direction and yields the amount of reflected light in a certain direction as ratio to the incoming light from all hemispherical directions. The BRDF may be used express the reflection behavior of a virtual material appearance and describes a non-trivial combination of different behaviors, such as glossiness, color, shape of the highlight, and Fresnel behavior (also known as Fresnel reflection).

The BRDF is particularly well adapted to describe the reflection behavior of a surface, notably when the BRDF is computed from a physically-based representation.

In examples, the BRDF representation may be extended by spatial-varying information to account for reflection behavior and surface changes across a surface as described by McAllister et al. in "*Efficient Rendering of Spatial Bi-directional Reflectance Distribution Function*" Computer, 2002.

The structure of a BRDF data set may range from a full-fledged measured representation, as described in in Matusik et al. in "*Efficient isotropic BRDF measurement*" EGRW '03 Proceedings of the 14th Eurographics workshop on Rendering 2, 2003, to small and efficient parametric models, as described in Ashikhmin et al. in "*An Anisotropic Phong BRDF Model*", Journal of Graphics Tools 5, 2000, or in Burley, B. and WaltDisneyAnimationStudios in "*Physically-based shading at Disney*", Acm Siggraph, 2012. This makes it difficult to compare available BRDF values without knowledge on the BRDF which was used to compute them. The method computes BRDF values directly from a representation of a virtual material appearance. This results in the BRDF values being consistent between different virtual material appearances and therefore allowing different appearance signatures to be compared to assess similarity.

The computation of values representing reflection by the BRDF may comprise computing multiple angular evaluations of the BRDF from the representation of the virtual material appearance. The computations of angular evaluations may be performed in a parametrized space covering the hemisphere of the BRDF, with an illumination having a spatially uniform neutral light.

Figure 4:
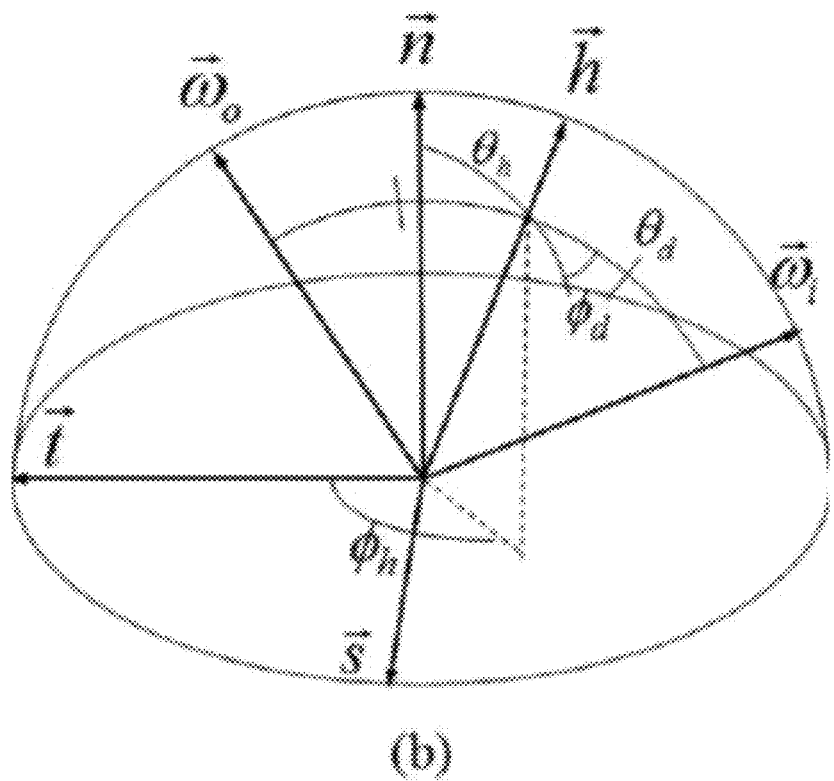
FIGS. 4 and 5 show an example of the principle of BRDF measurements and two slice representations for two virtual material appearances as known in the prior art.

An angular evaluation is a measurement of the BRDF for one hemispherical angle. The BRDF is a function defined in the domain of incoming and outgoing directions oriented around a surface normal as shown in FIG. 4. The BRDF calculates how much of the incoming light reflects into a certain outgoing direction. Typically, the BRDF does not need to be applied to a surface to be evaluated, as it does not depend on position. Alternatively, the BRDF can depend on position, however, changing the BRDF with position will change the visual structure of the observed appearance, which is covered by the "structure" feature.

Figure 5:
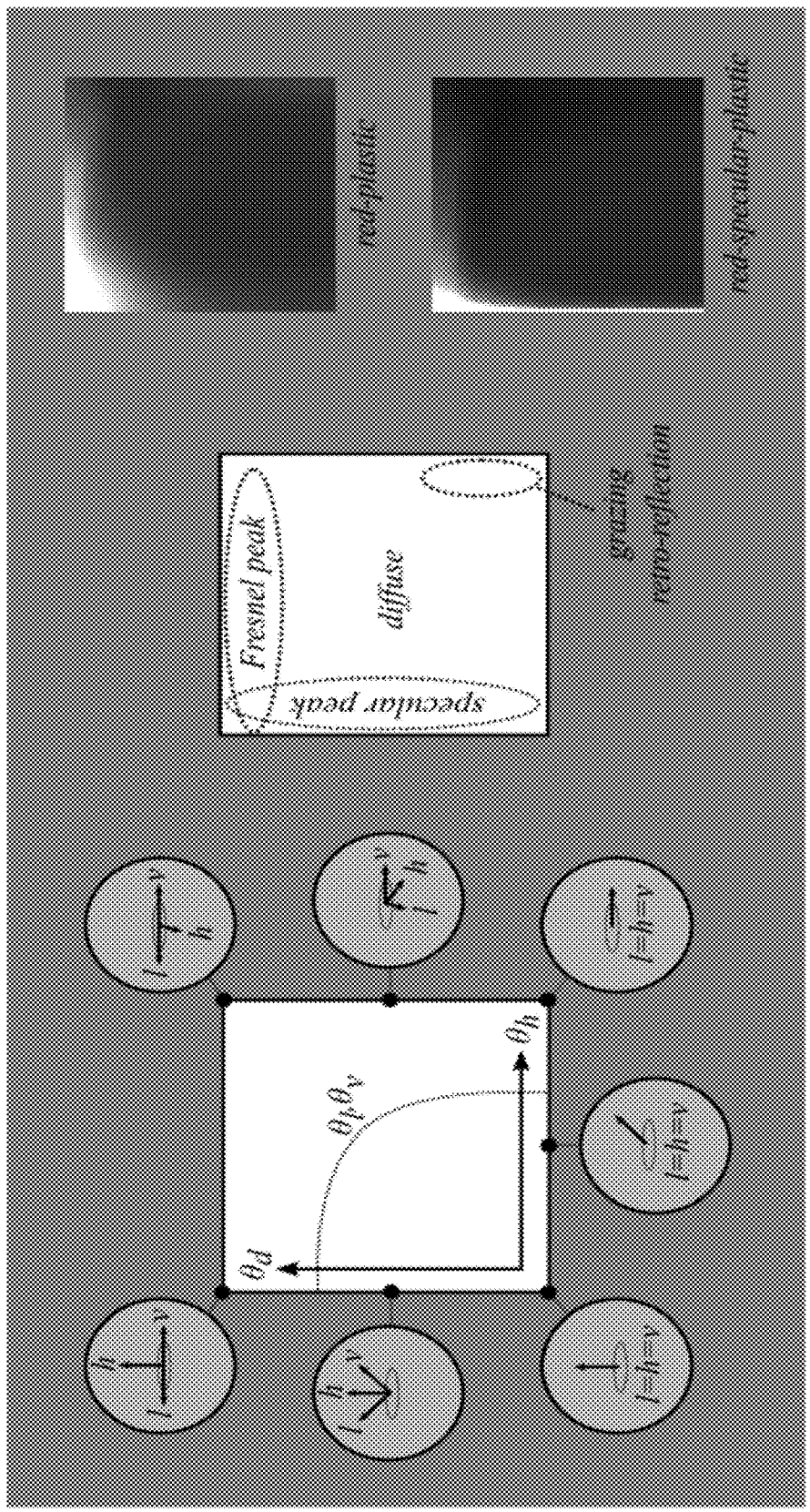

The BRDF may depend on a set of parameters, for example angular parameters. Each angular evaluation may have a different set of parameter values, such as different angular values. The set of parameters forms a parametrized space. The angular evaluations may explore the parameter space, for example by varying the values of the angles in the BRDF. In examples, the angular evaluations of the BRDF may be represented as a 2D image/slice (as shown in FIG. 5). Alternatively or additionally, the angular evaluations of the BRDF may be stored in computer memory as a vector of values, in other words a reflection feature vector.

The BRDF evaluation values may depend on incoming light, in other words illumination. Using spatially homogenous neutral light results in the BRDF values being independent of the lighting conditions. The term "spatially homogenous" means that neutral light arrives from all possible angles in space surrounding the representation, this allows to factor out the directional dependency on the light. Neutral light is light that has a same value for each RGB component and/or for each wavelength (e.g. a value of one). This constant factor among RGB components and/or wavelengths removes angular lighting dependency.

The visual perception of a virtual material is not only dependent on its appearance. The light sources in the environment of the virtual material can change a user's visual perception. Therefore, a given virtual material appearance will be perceived differently in different environments. For example, a virtual material applied to a modeled object representing a gray stone will appear darker in an environment with little illumination than in a bright environment. This is not only valid for digital image synthesis; it is exactly the same in the real world. Spatially homogenous neutral light allows the values representing reflection not to be affected by lighting environment.

Referring now to FIG. 5, in examples, a rough virtual measurement is performed when computing evaluations of the BRDF. The virtual measurement is similar the real-world measurements described by Matusik W. et al. in "*Efficient isotropic BRDF measurement*", 2003, EGRW '03 Proceedings of the 14th Eurographics workshop on Rendering. When performing the virtual measurement, ail information relevant to structure is neglected, e.g. all spatial varying information from textures such as color, normals or roughness. This results in values which quantify reflection and are completely independent from structure. In examples, only spatial varying color is neglected and color of BRDF reflection is preserved but ignored. In such examples, the BRDF color information may be used when no color texture is available. The parameterization for the measurement space is that of Rusinkiewicz half-angle representation, as discussed by Rusinkiewicz in "*A New change of Variables for Efficient BRDF Representation*", 198, Rendering Techniques '98, pp 11-22. In order to lower the number of parameters to evaluate, the $\varphi_d$ dimension can be fixed to 90°.

This results in reducing the amount of data to process, anisotropy information is sacrificed but this does not enter significantly in the considerations for appearance (the impact of fixing the $\varphi_d$ dimension to 90° is small). A full measurement of the BRDF comprises physical angular measurements in a very fine resolution (e.g. one degree or less) to capture most of the angular variations in the BRDF of the appearance. This includes multiple angular evaluations, which may then be represented as a 2D image/slice as discussed by Burley, B. and WaltDisneyAnimationStudios in "*Physically-based shading at Disney*", Acm Siggraph, 2012, and shown in FIG. 5. Different regions of the slices can be associated with certain visual BRDF features, such as specular peak, Fresnel peak, grazing retro-reflection and diffuse reflection. In other words, the visually important BRDF aspects are computed in a spatially separated way as a simple 2D data structure. This simple 2D data structure is independent of the underlying appearance data model. Similarity between BRDFs may then be reduced to a 2D image comparison problem. FIG. 5 shows two slices, one representing the BRDF measurement for red-plastic and the other for red-specular-plastic.

In examples, a log-relative normalization scheme such as the one discussed by Nielsen, J. B. in "*On Optimal, Minimal BRDF Sampling for Reflectance Acquisition*", 2015, IEEE Signal Processing and Signal Processing Education Workshop, may be used on the 2D slices. The 2D slices have a high dynamic range. For example, values in the specular peak area might be several magnitudes higher than the value of e.g. the diffuse area. The difference in orders of magnitude may hide interfere with the lower values (e.g. the values of the diffuse area). The log-normalization reduces the dynamic range to facilitate the interpretation of the slice. The log-normalization does not affect the comparison of slices. The log-normalization dampens intra-BRDF variation while preserving the inter-BRDF variation, and therefore the comparability of the BRDFs.

Figure 6:
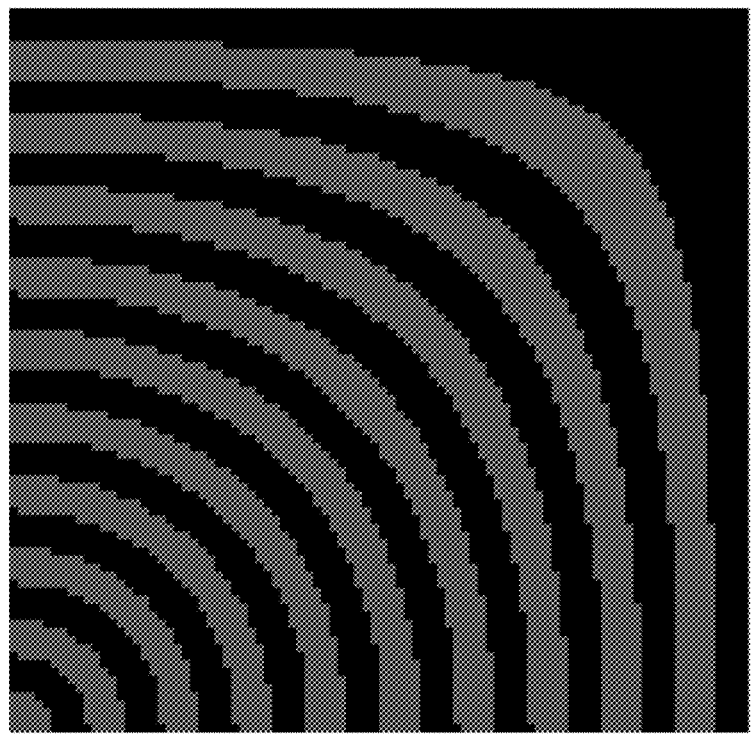
FIG. 6 shows an example of a screenshot of stripe pattern in black lacquer clear-coat for the lighting during reflection measurements.

Now referring to FIG. 6, the illumination may include a frequency component. In examples, the uniform neutral light may be a pattern in which intensity varies. In examples, when iterating a hemisphere in longitude angular directions for an incoming light evaluation, an intensity reduction is applied in regular segments to the neutral lighting information to produce a stripe pattern. In such a case, the pattern may be a procedural stripe pattern as illustrated in FIG. 6. This allows for the differentiation between very diffusive virtual materials with respect to very reflective virtual materials. For example, a perfect mirror and fully diffusive material result in the same homogenous BRDF measurement slice for a uniform neutral lighting environment, and adding a stripe pattern to the lighting allows their differentiation. This increases the precision of the similarity measurements.

Figure 7:
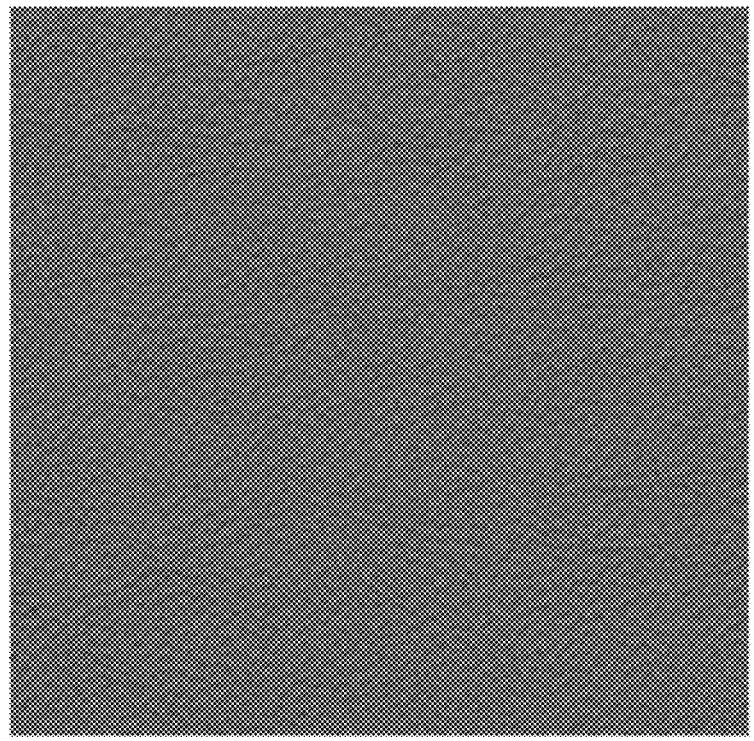
FIG. 7 shows an example of a screenshot of a representation of structure values for a from a yellowish leather virtual material appearance.

The computation of values representing the structure of a virtual material appearance may comprise sampling a virtual measure plane of the representation with a lighting having a spatially uniform neutral light, as well as evaluating a hemispherical integral of reflected light of the lighting for each sample position on the plane. Structure is the result of spatially changing reflection behavior across a surface. The sampling may be performed in discrete steps and, at each sample point, the hemispherical integral of the reflected light may be evaluated to quantify the structure feature of the virtual material appearance. This results in the structure evaluation measuring spatial varying texture information in addition to spatially changing reflection behavior. In examples, the quantifications of the structure feature may be represented in a 2D image slice, such as the one shown in FIG. 7. Alternatively or additionally, the quantifications of the structure feature may be stored in computer memory as a vector of values, in other words a structure feature vector.

In examples, the measurement result of a virtual measure plane may be a 2D image/slice containing measurement information synthesized from the virtual material appearance. Additionally or alternatively, values representing the color feature may also be computed from the virtual measurement. This increases the performance of the method as one same representation may be involved in computing values for structure and color, without having to re-compute it every time.

In examples, the feature vector for color is a three component CIELAB mean color computed from a structure slice.

In examples, a scattering transform algorithm as proposed by Sifre, L. and Maillat S. in "Combined scattering for rotation invariant texture analysis", ESANN 2012 proceedings, is used to extract a rotational invariant and deformation stable structural feature representation from a slice.

The computing of an appearance signature may comprise reducing the dimensions of the appearance signature.

An appearance signature which includes all the values quantifying the features of the virtual material appearance associated to the appearance signature may be very large and thus require a significant amount of memory for processing and storing. The appearance signature may have its dimensions reduced, for example, by reducing the amount of values representing the features of the virtual material appearance while retaining at least one value for each feature. This facilitates the usage of the appearance signature in the database which may have a limited indexing size, for example between 50 and 200 values, or limited to 100 values, while the reduced appearance signature comprises between 10 and 100 values, for example 40 values.

The reduction of the dimensions (dimensionality reduction) of the appearance signature may comprise performing a principal component analysis (PCA) on values respectively representing at least one of structure, reflection and color of associated virtual material appearances of the database. In examples, the PCA may include a singular value decomposition (SVD). The PCA may be performed as a pre-processing step, prior to providing the first appearance signature and/or prior to the database being provided. After performing PCA, a number of basis vectors are obtained. The number of basis vectors may be obtained automatically by a processor. The basis vectors may then be used to reduce the number of computed values for each of the features of the virtual material appearances in the database. In examples, a feature vector used to compute the appearance signature may be projected to a space defined by the basis vectors effectively reducing the number of values in the feature vector. The basis vectors may be stored in computer memory for future use. For example, in order to reduce the dimensions of an appearance signature of a virtual material not stored in the database.

Reduction of the number of computed values for an appearance feature makes the appearance signature smaller in terms of computer memory. In examples, the non-reduced representation (e.g. a feature vector represented by a 2D image) of a feature vector may be too large, for example, 26688 values for a texture feature vector, 16384 values for the reflection features and 3 for the color. The reduction of values using PCA allows reduction of the number of these values, for example to less than 100 total values for all 3 features, without losing much information. The appearance signature is therefore more easily processed in volatile computer memory and takes less space in non-volatile computer memory, this speeds up the comparison between appearance signatures. Notably, the appearance signature may be taken as an input for most database indexers which are limited to a certain input size.

Notably, PCA is particularly suitable for reducing BRDF values. Applying a principal component analysis (PCA) to a set of diverse material measurements yields a small set of basis vectors which isolates all of the dominant visual BRDF features.

In examples, a matrix may be computed from all the values representing one feature for multiple the virtual material appearances in the database. PCA may then be performed on the computed matrix. Alternatively, PCA may be performed on the 2D representations of the values of a feature for multiple virtual material appearances in the database. The multiple virtual material appearances in the database may be all the virtual material appearances in the database or at least a representative set of virtual material appearances in the database. A representative set corresponds to a set of virtual material appearances which accurately reflects the other virtual material appearances in the database (e.g. 85%, 95% or 100% of the virtual material appearances in the database).

Figure 8:
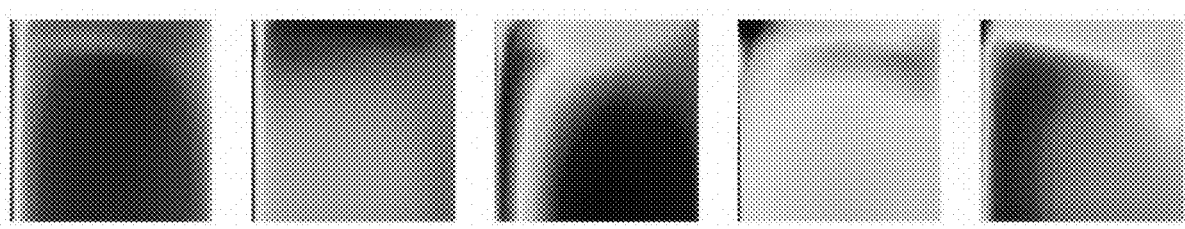
FIG. 8 shows an example of screenshots first five PCA basis vectors visualized as 2D slices following BRDF data reduction.

Referring now to FIG. 8, examples of basis vectors for the reflection feature are calculated at pre-processing, by applying a PCA decomposition on slice representations of reflection of all the virtual material appearances in the database. As color information is mostly determined by textures as part of the spatial varying properties of the appearance definition, the RGB color channels may be treated as separate grayscale PCA samples. The principal component vectors may be extracted by applying SVD on the mean-subtracted, normalized sample matrix:

$$(X-\hat{\mu})=U\Sigma V^T \quad (5)$$

Where:
X is the sample matrix with the single-channel image slices and its rows;
$\hat{\mu} \in \mathbb{R}^{m \times p}$ is the matrix with the mean sample row-vector, m is number of elements in the vector (e.g. 24300 for BRDF feature) and p is the number of samples (e.g. number of BRDF slices);
$V^T \in \mathbb{R}^{m \times p}$ is the conjugate transposed of V and its columns represent the principal components of the sample data space;
$\Sigma \in \mathbb{R}^{k \times k}$ is a mathematically defined term for singular value decomposition and its diagonal values hold the variance values of the principal components, where k is the number desired principal components (e.g. 5 for BRDF the feature);
U is a matrix of the SVD as known in the art.

A matrix $Q \in \mathbb{R}^{k \times p}$ may be used to project each slice (or the corresponding feature vector) $S \in \mathbb{R}^{p \times 1}$ onto a k-dimensional feature space vector $\hat{S} \in \mathbb{R}^{k \times 1}$, where:
the rows of are the k principal components with the highest Eigenvalues;
S is the mean value grayscale version of the original slice;
the axis of Ŝ represents the BRDF features with highest variation across the virtual material appearances in the database and verifies:

$$\hat{S}=QS$$

FIG. 8 shows first five PCA basis vectors visualized as 2D slices for reflection.

In examples, basis vectors for the structure feature are calculated in a pre-process by applying a PCA decomposition on the scattering coefficient representations of all the virtual material appearances in the database.

Tests were performed for BRDF measurements. 1° angular increments were performed for $\theta_h$ and $\theta_d$ resulting in 90×90 pixel image slice representing the BRDF measurements, which considering RGB measurements, corresponds to 24300 float values for one slice. After dimensionality reduction the number of values was reduced to 5 while retaining a reliable representation of the behavior of reflection, thus allowing comparisons for identifying similarity.

Tests have also shown that for the scattering transform for the structure feature, an optimal parameter configuration with regards to performance/storage trade-off consisted of 26688 float coefficients as a feature vector. This number was reduced after dimensionality reduction to around 30 values without too much quality loss compared to higher dimensional compression.

The first appearance signature may be computed from a reduced number of values representing at least one of the structure, the reflection and the color of the first virtual material appearance. The basis vectors computed for the different features during pre-processing may be used to reduce the number of values as was the case for the appearance signatures of the virtual material appearances in the database. Since the basis vectors have been computed previously the reduction of the dimensions of the first appearance signature is performed efficiently.

The following is a discussion on an example (100) implementation of the method. A database including virtual material appearances is provided and each virtual material appearance in the database is associated with an appearance signature which includes values quantifying the features of structure, reflection and color.

Figure 9:
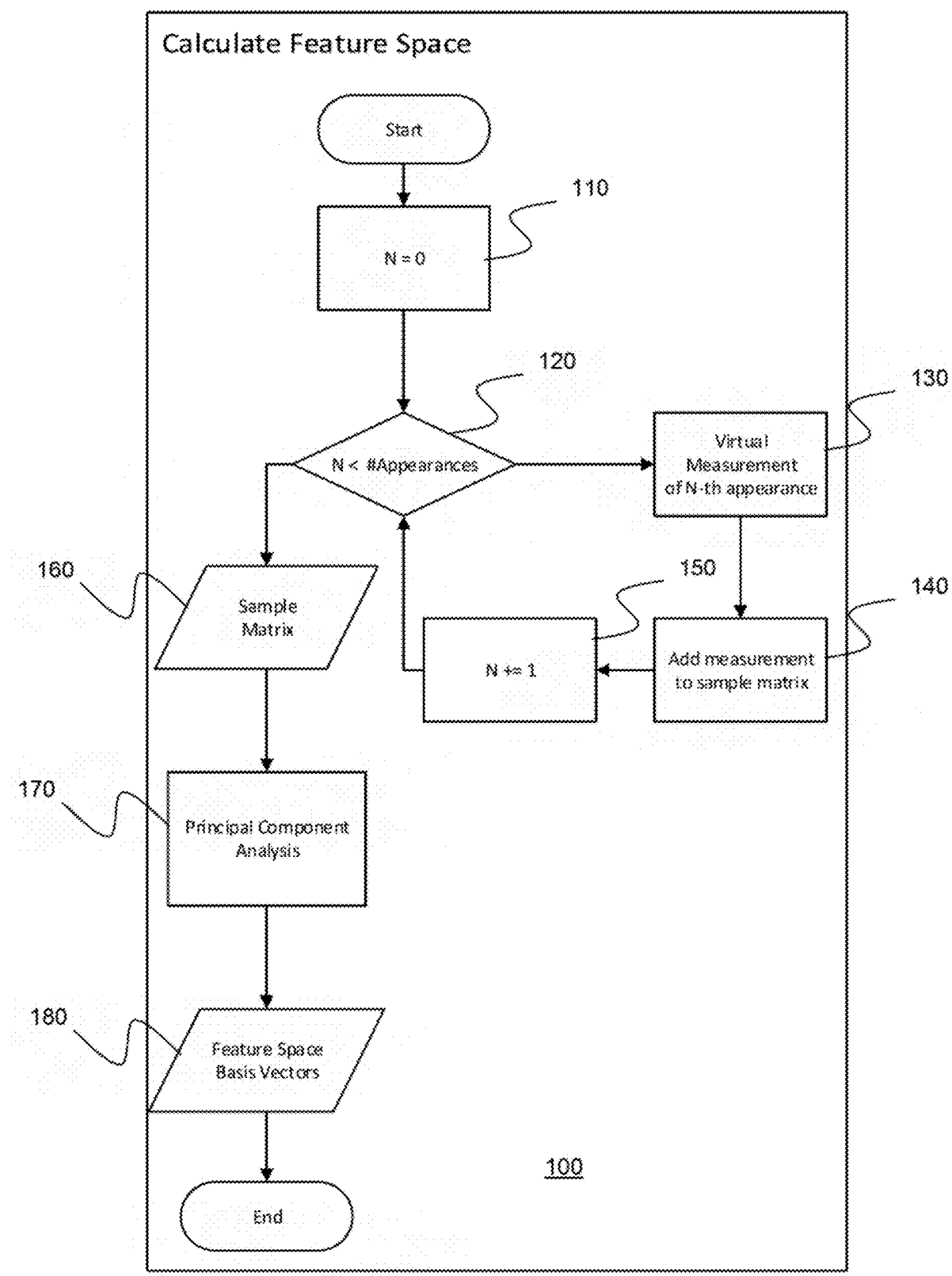
FIG. 9 shows a flowchart of an example of the computation of basis vectors.

Referring to FIG. 9, a pre-processing is performed to reduce the dimensions of the appearance signatures in the database and to store the computed basis vectors for the features. The calculation of the basis vectors is initiated (110) and it is verified that values quantifying the feature have not been computed for all virtual material appearances of the database (120). Next, values quantifying the feature are computed from a synthesized representation of the virtual material appearance (130). The values are then added to a sample matrix, for example in the form of a column or line vector (140). This is repeated (150) until the sample matrix includes the values for all the virtual material appearances (160). Next a PCA (170) is performed on the sample matrix in order to obtain the basis vectors (180). This is performed for structure and reflection features.

The basis vectors are used to reduce the dimensions of the appearance signatures of the virtual material appearances in the database. The basis vectors can be then stored in memory for future uses.

Figure 10:
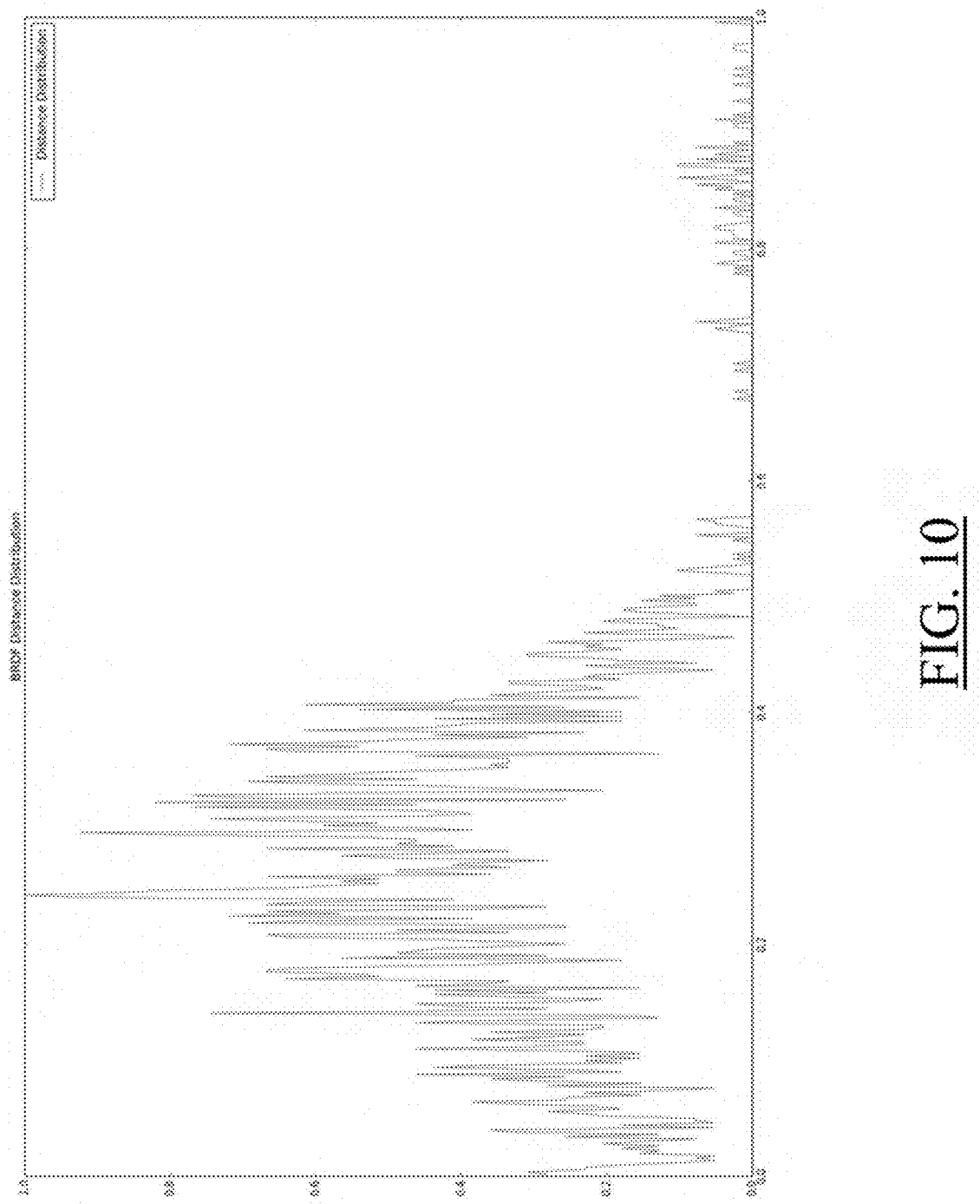
FIG. 10 shows a screenshot of a graph plotting distances between respective pairs of BRDF values for a set of virtual material appearances.

Referring now to FIG. 10, in order to facilitate the managing of weights added to appearance signatures when performing similarity retrieval in the database, one or more normalization and one or more linearization factors are computed.

The computation of these factors comprises defining a distance matrix $D_i = \delta_{mn}$ with $1 \le m$, $n \le N$ where N is the number of materials in the database. The normalization term is then:

$$\rho_i = \max(D_i)$$

The distribution of distances for a feature in normalized parameter space shows non-linearities when compared to the distribution of distances in a normalized parameter space for another feature. For this reason, a linearization function is determined. The plot in FIG. 10 shows the distribution of distances 500 for the structure feature between virtual material appearances in the database.

Figure 11:
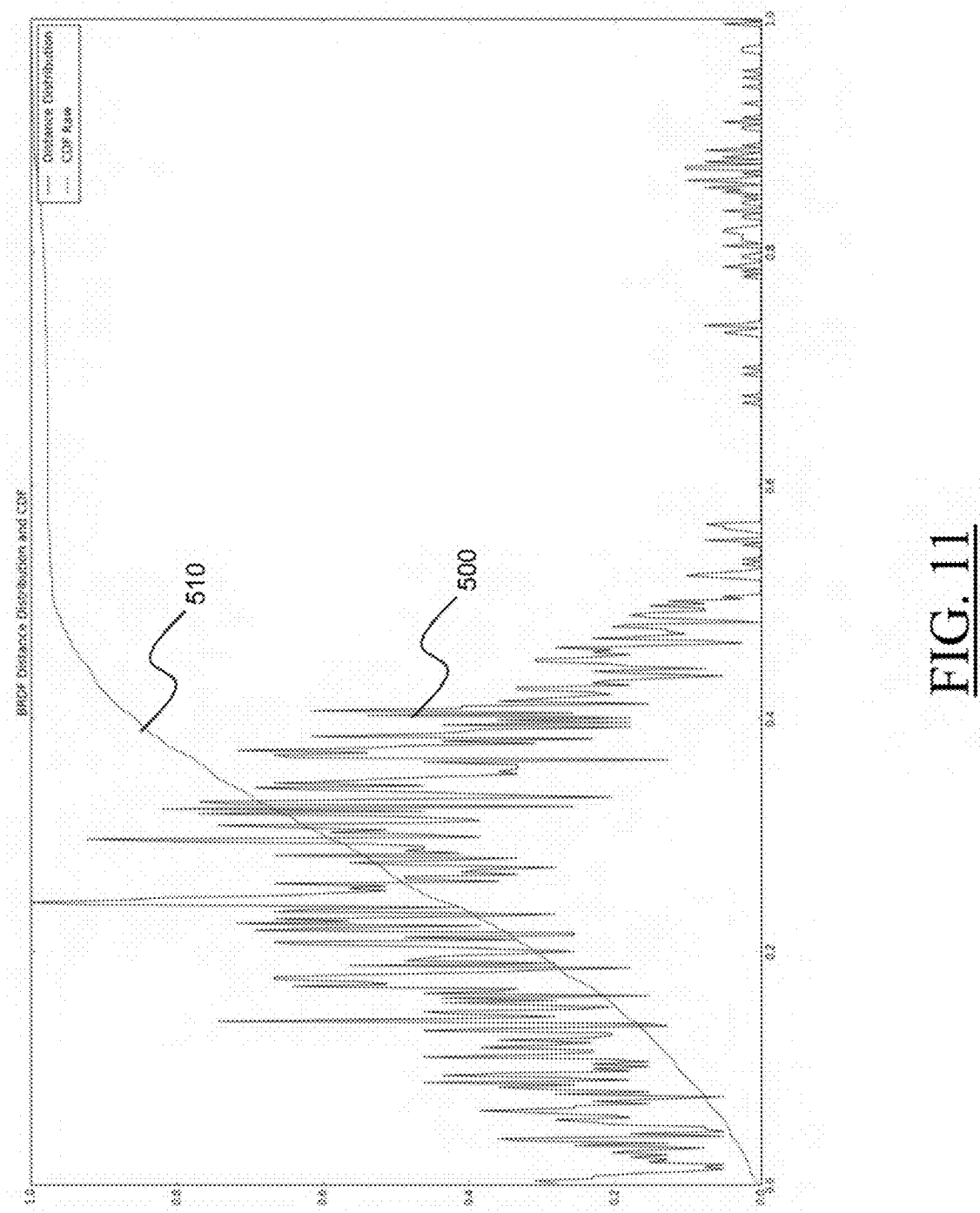
FIG. 11 shows a screenshot of a graph plotting distances between respective pairs of BRDF values for a set of virtual material appearances and an associated cumulative distance distribution.
Figure 12:
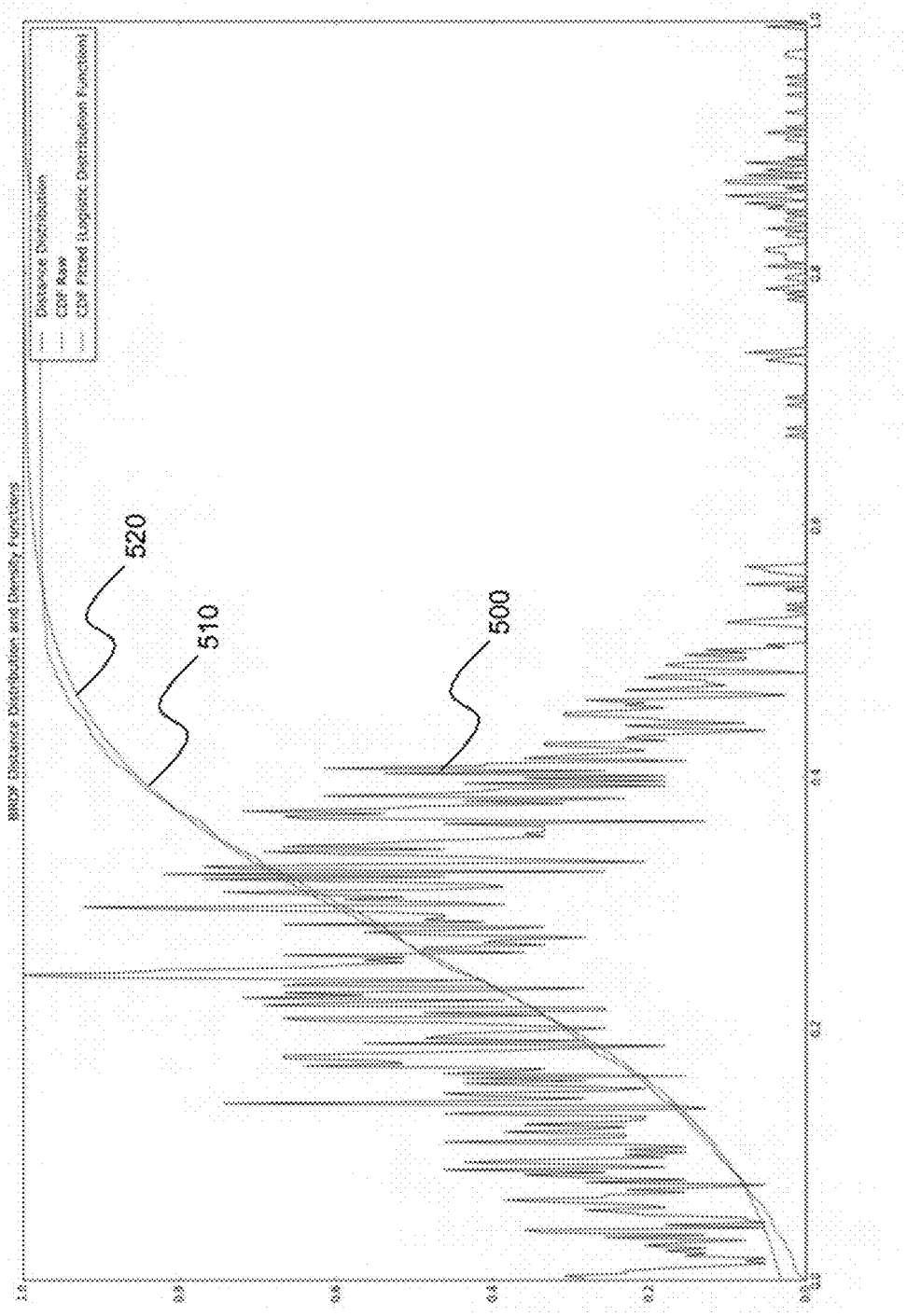
FIG. 12 shows an screenshot of a graph plotting distances between respective pairs of BRDF values for a set of virtual material appearances, an associated cumulative distance distribution and a fit to the cumulative distance distribution.

Referring now to FIG. 11, a cumulative distribution function (CDF) 510 for the distribution of BRDF distances 500 is computed in FIG. 11. On FIG. 12, the cumulative distribution function is analytically approximated by fitting a logistic distribution 520 (noted CDF fitted) function to it. The resulting coefficients can be used to linearize the parameter space. This allows to associate weights which vary in similar ranges to values of different features when performing the similarity retrieval.

Figure 13:
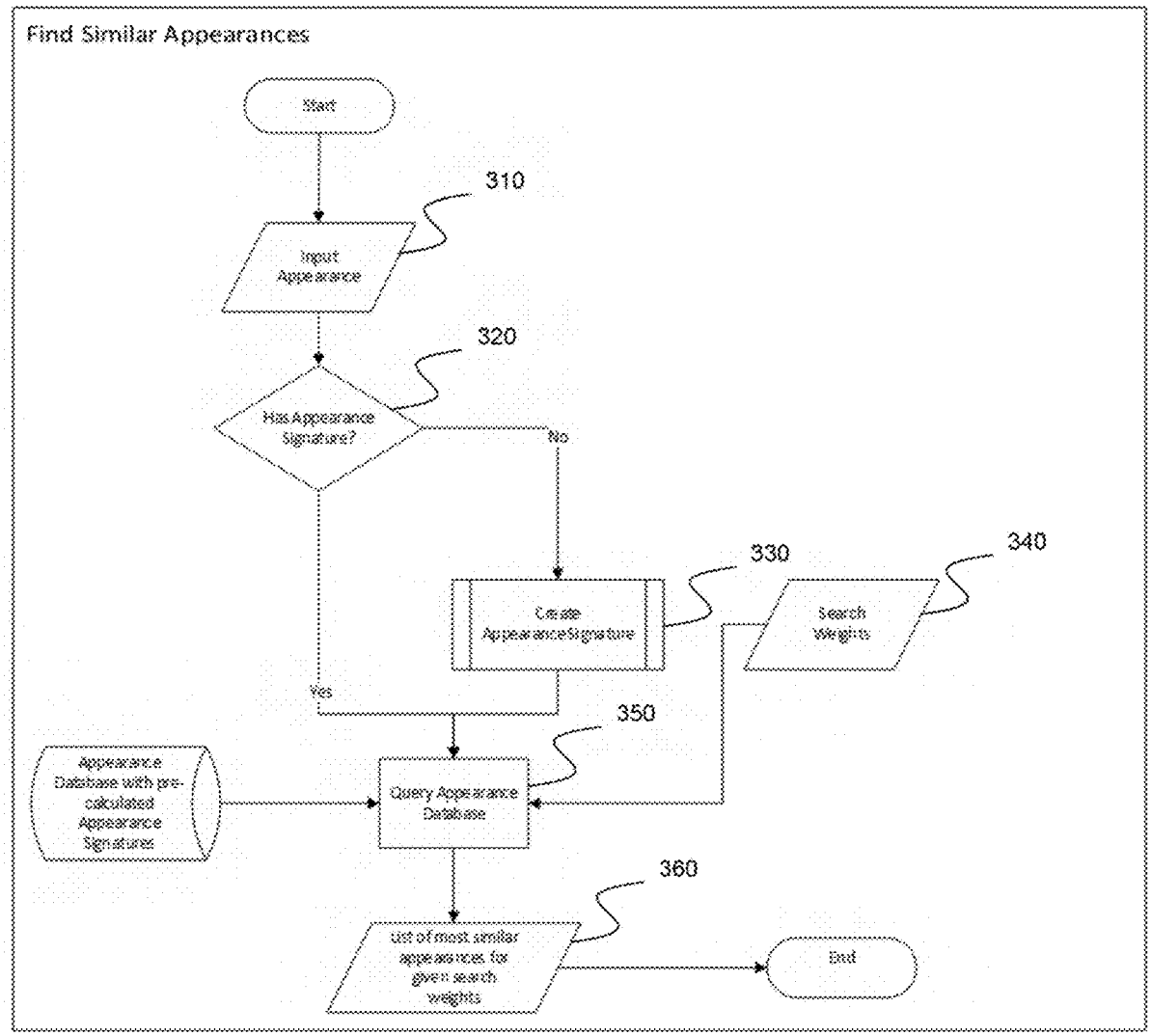
FIG. 13 shows a flowchart of an exemplary implementation of the method.

Referring now to FIG. 13, after the basis vectors and linearization/normalization terms have been determined, a user or an application inputs (or provides) a first virtual material appearance (310); data representing the first virtual material appearance is available for further computation performed by a system executing the method. A determination (320) is performed (e.g. by the processor) verifying if the inputted first virtual material appearance is associated to a first appearance signature. This is performed as known in the art. If no first appearance signature is identified, then a first virtual material appearance is created (330).

Figure 14:
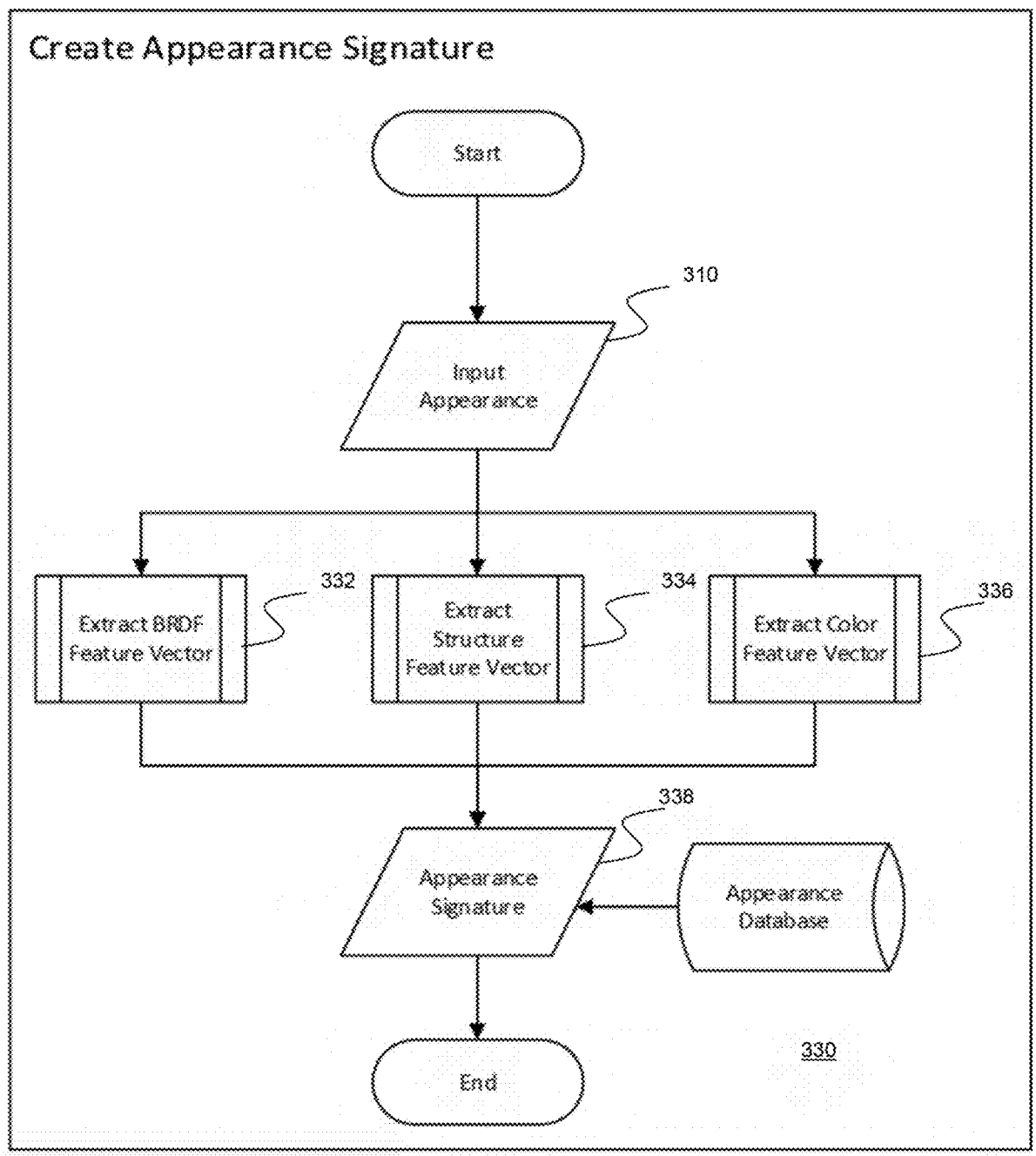
FIG. 14 shows a flowchart of an example of the computation of an appearance signature.

Referring to FIG. 14, an example of the creation of the appearance signature (330) is discussed. The creation of the appearance signature (e.g. a first appearance signature) comprises computing/extracting feature vectors for reflection (332), structure (334) and color (336). The computations/extractions may be performed as discussed. The appearance signature is a concatenation of each extracted feature vector on which corresponding normalization and linearization factors are applied.

Figure 15:
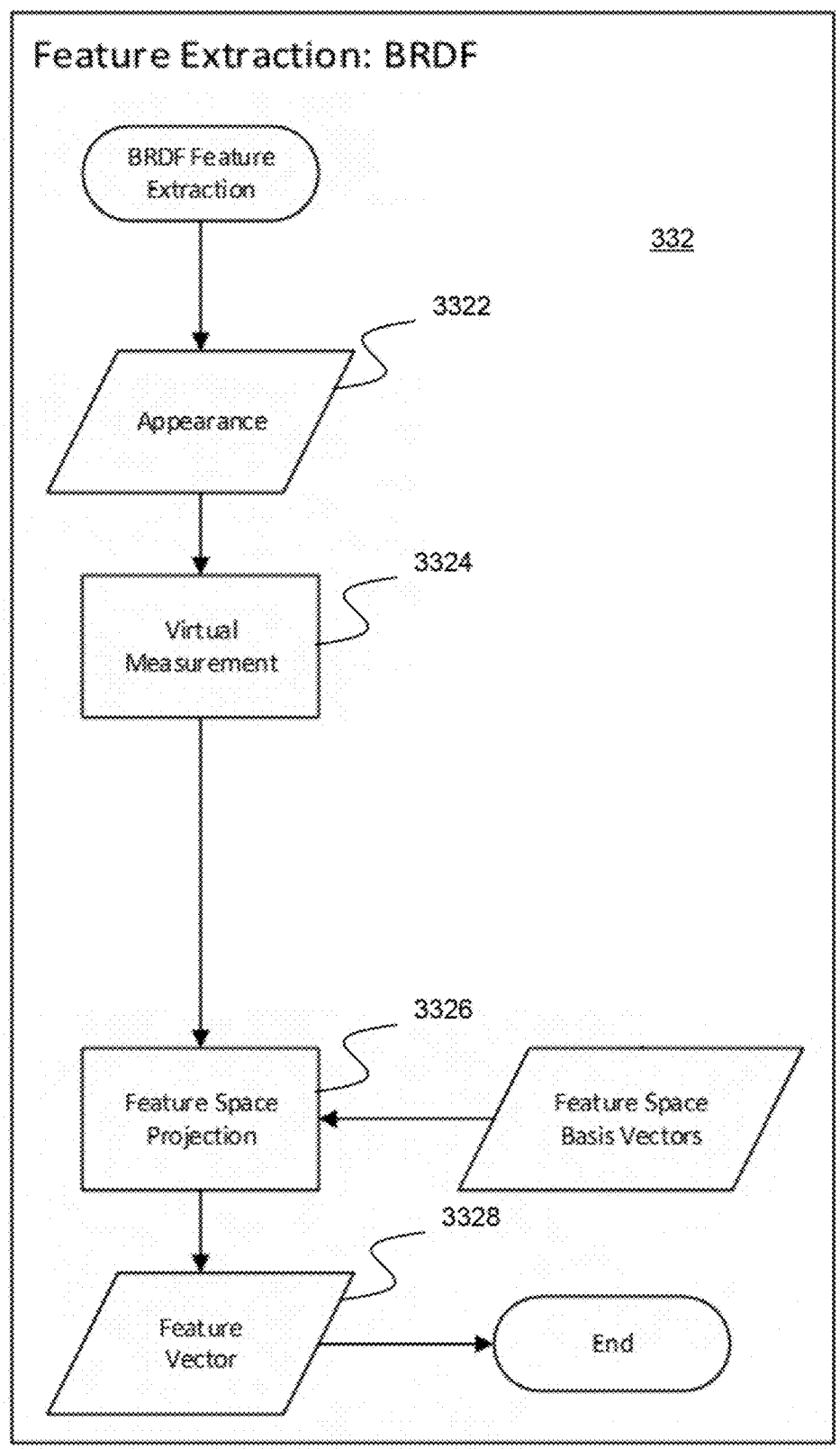
FIG. 15 shows a flowchart of an example of the computation of BRDF values.

Referring to FIG. 15, an example of computing/extracting feature vectors for reflection is discussed. The extraction of the reflection feature vector comprises synthesizing a representation of the visual material appearance used as input (3322). Measurements comprising evaluations (3324) of the BRDF (e.g. virtual measurements) are performed exploring parameters of the BRDF, for example by performing 1° angular increments for $\theta_h$ and $\theta_d$, in order to measure reflection values from the synthesized representation. The parameters of incoming light needed for the BRDF evaluations simulate spatially uniform white light. The resulting values are projected (3326) according to reflection basis vectors. This results in the creation of a reflection feature vector (3328), with a reduced number of values which retains the most important characteristics of the reflection feature of the virtual material appearance used as input. The size of the reflection feature vector is between 5 and 20 float values. In examples, 5 float values may be an optimal size for the reflection feature vector, as less values significantly worsens the quality of the results and more values do not significantly improve the quality of the results.

Figure 16:
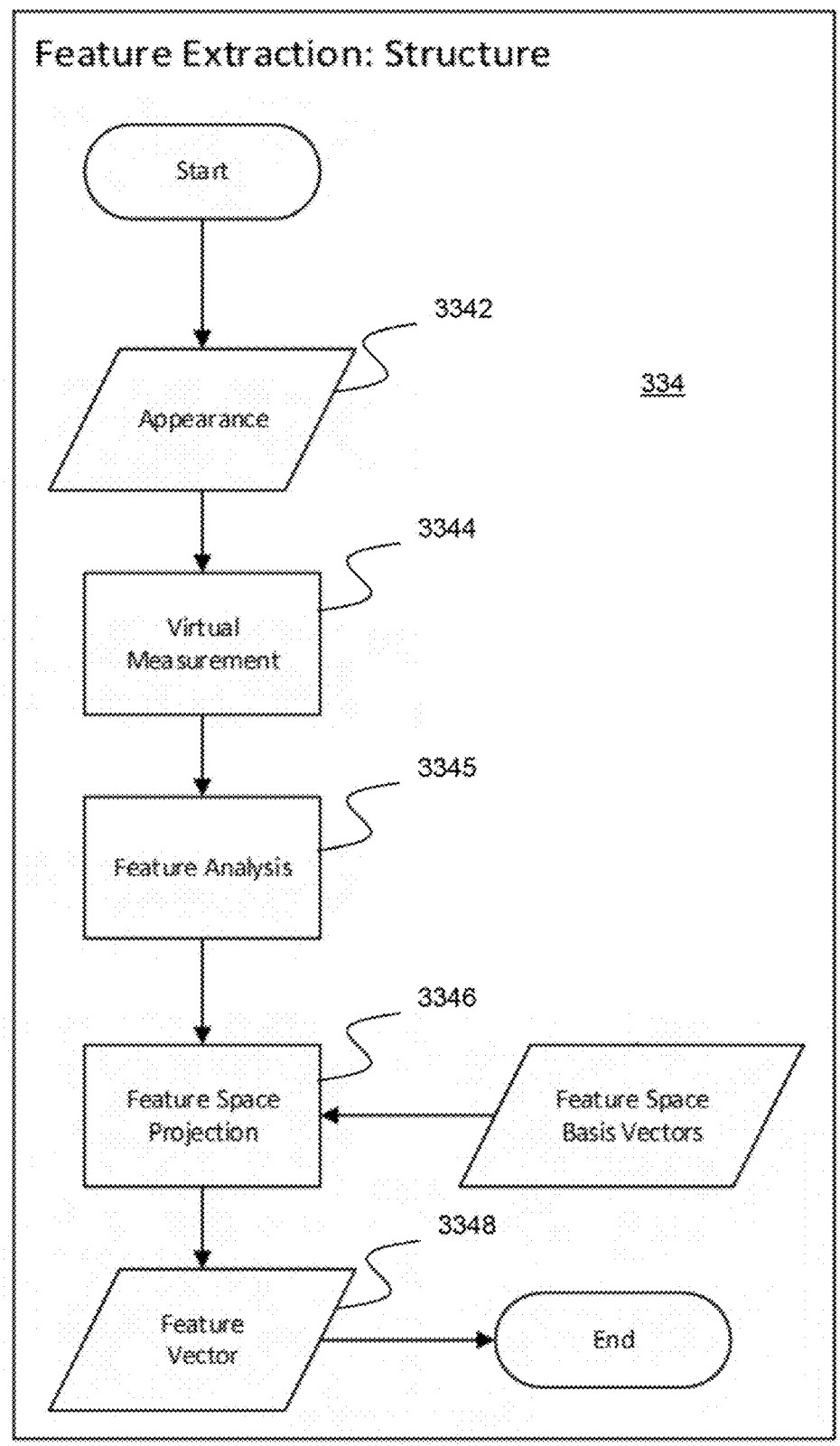
FIG. 16 shows a flowchart of an example of the computation of structure values.

Referring to FIG. 16, an example of computing/extracting structure feature vectors is discussed. The extraction of the structure feature vector comprises synthesizing a representation of the visual material appearance used as input (3342). A virtual measurement is computed from the representation on a virtual. The plane is discretized into discrete sample steps. At each sample position the hemispherical integral of reflected spatially uniform incoming neutral light is evaluated (3344). Next a feature analysis based on scattering convolution networks is performed to extract the structural features of the calculated slices (3345). For example, a feature analysis based on the paper "Invariant Scattering Convolution Networks" by Joan Bruna and Stephane Mallat may be performed. This technique proved to be reliable when it comes to recognition of structural features independent of orientation and size. Then, the resulting values are projected (3346) according to the basis vectors corresponding to structure and computed during the pre-processing. This results in the creation of a structure feature vector (3348) with a reduced number of values which retains the most important characteristics of the structure feature of the virtual material appearance used as input. The size of the structure feature vector may be for instance between 30 and 60 float values.

Figure 17:
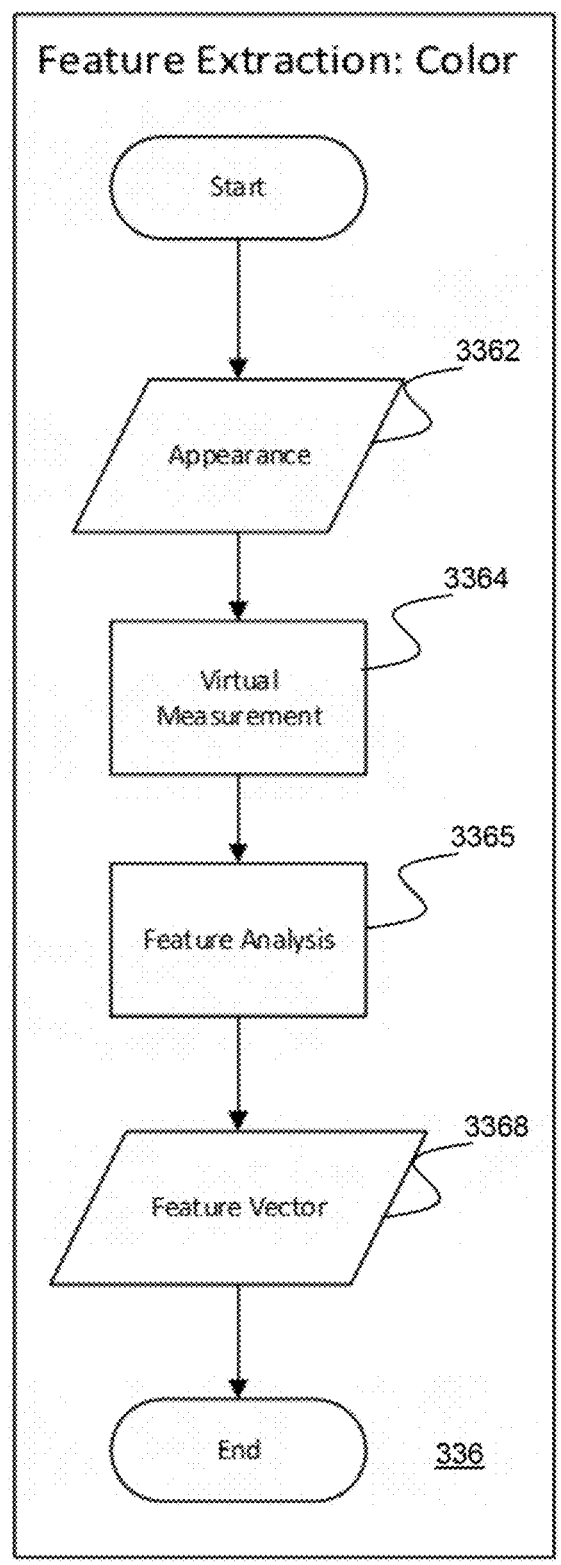
FIG. 17 shows a flowchart of an example of the computation of a color values.

Referring to FIG. 17, an example of computing/extracting color feature vectors is discussed. The extraction of the color feature vector is performed on a synthesized representation of the virtual material appearance used as input (3362). Measurements (3364) comprising extracting the three component CIELAB colors for the representations are performed. The mean of the measurements for each component is computed (3365) and the results from the color feature vector (3368).

Back to FIG. 13, after a first appearance signature is created and/or if a first appearance signature is identified, the user selects weights for adjusting the query of the database (340). The weights scale the search interest between the features: reflection (e.g. how glossy is the material), structure (e.g. structural pattern via color or normal variation) and color (the overall color of the appearance). Three weights, one for each feature can be independently changed. Each weight varies in a same range, for example from 0 to 1. The database is queried using the first appearance signature (350). The first appearance signature is compared to the appearance signatures associated to the virtual material appearances in the database using a similarity metric which gives a value to the similarity between the virtual material appearances. Next, a list of similar virtual material appearances (360) which are the most similar to the first material appearances according to the search weights is returned. A similar virtual material appearance is a virtual appearance from which the similarity metric yields a value higher than from other virtual material appearances (e.g. by applying the similarity metric on the associated appearance signature). The most similar virtual material appearances in the database are the virtual material appearances from which the similarity metric yielded the highest values for all the virtual material appearances compared in the database (e.g. all the virtual material appearances in the database).

The number of similar material appearances in the list may be a predetermined number and/or be virtual material appearances from which the value of the similarity metric is above a given threshold (e.g. above 0.5 or above 0.7). The list of similar virtual material appearances may comprise an image on which the virtual material appearance has been rendered, for example on an object. The list of similar virtual material appearances may further comprise sub lists of similar virtual material appearances with respect to only one feature. The list of similar virtual material appearances may comprise returning a 2D image/slice representation of a feature vector associated to one or more listed similar virtual material appearances. The list may be comprised of only one similar virtual material appearance, alternatively it may be comprised of multiple similar virtual material appearances. The list may include an image with the rendered first virtual material appearance.

Figure 18:
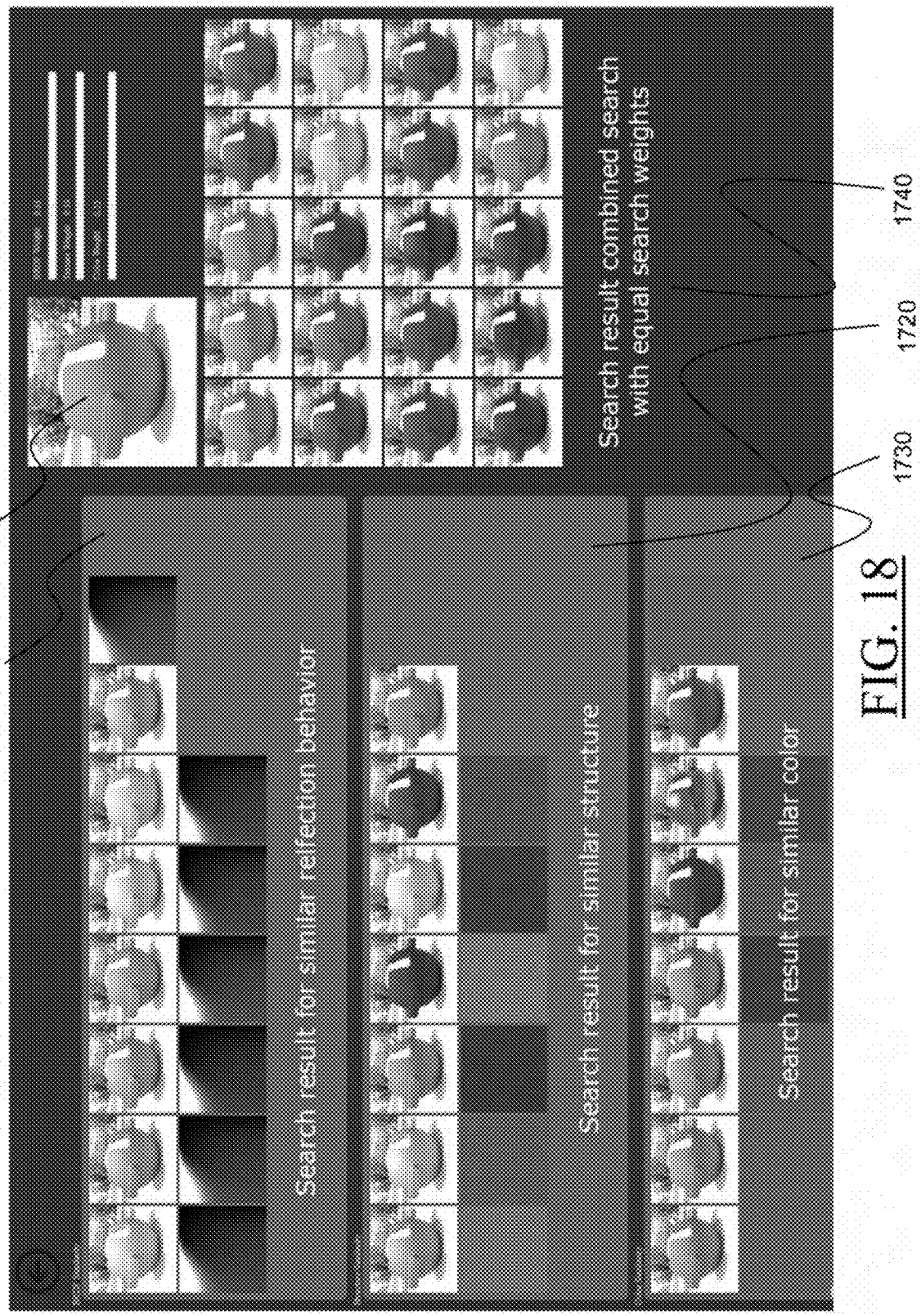
FIG. 18 shows a screenshot of virtual material appearances retrieved from a database according to the method and rendered in a pre-generated thumbnail.

In examples, the list may comprise at least the virtual material appearance which is the most similar to the first virtual material appearance. FIG. 18 is a screenshot of a graphical user interface (GiII) adapted to display the result of the method. In this example, a query is performed in the database for an orange alcantara virtual material appearance used as input, e.g. the user selected this (first) orange alcantara virtual material appearance 1700 in the database while designing a product to be manufactured. The weights for each of the extracted BRDF feature vector (332), structure feature vector (334) and color feature vector (336) are the same in this example. In FIG. 18, the most similar virtual material appearances are retrieved from the database for each of the extracted feature taken individually, as shown on the left part 1710, 1720, 1730 of the GUI. The right part 1740 of the GUI displays representations of rendered virtual material appearances similar to the first one according to equal search weights.

Figure 19:
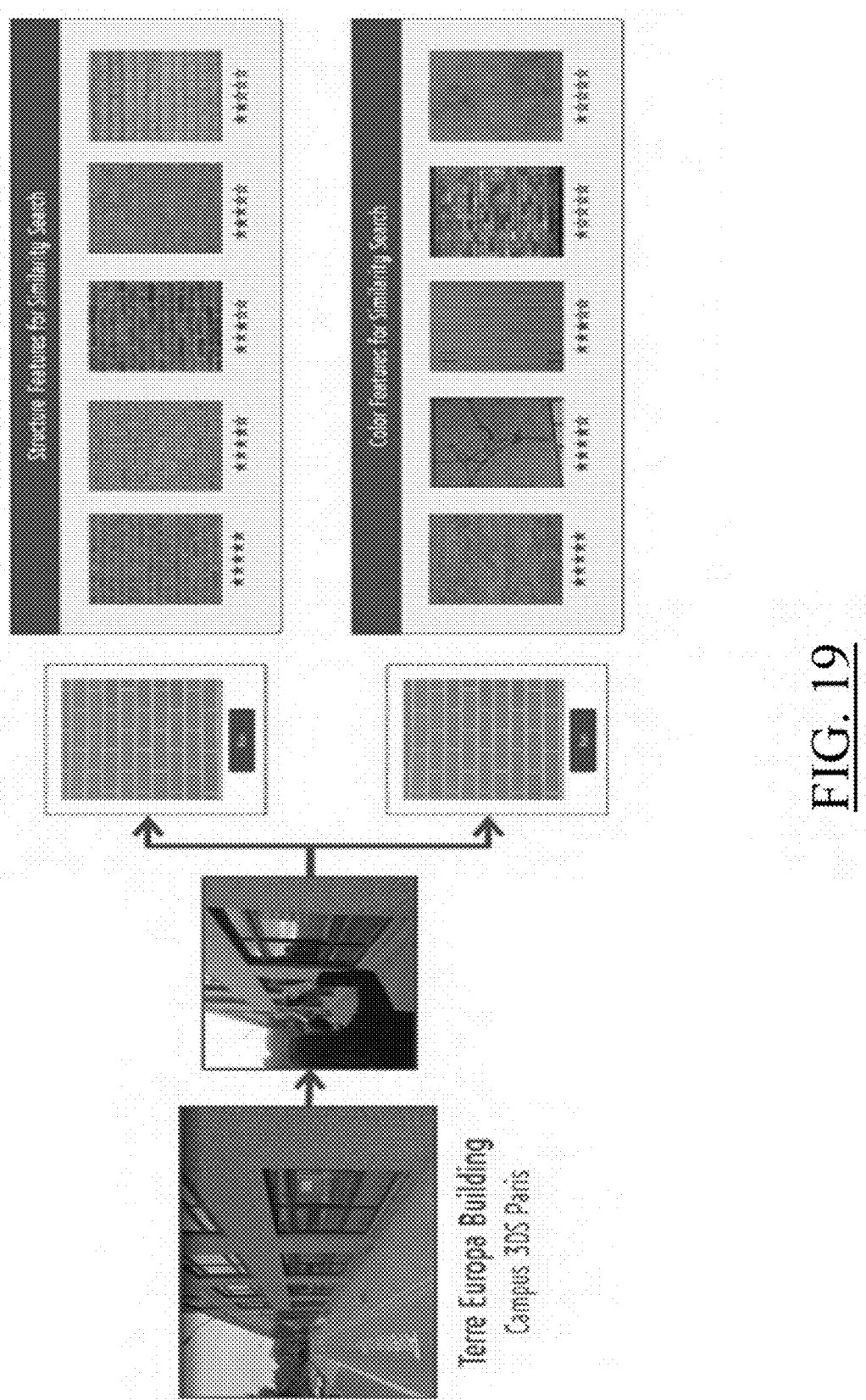
FIG. 19 shows an example of an application of the method.

Referring now to FIG. 18, in examples, a real-world image (e.g. a photo) of the wall of a building is provided. The picture may be retrieved from the internet or taken with a device, such as a phone. The picture is used as input (e.g. data extracted from the image) for a similarity search for structure and color features. Next, representations (e.g. respective images) of virtual material appearances in a database are returned based on the method. The virtual material appearances may then be used to texture CAD objects. Thus, a user may use the method described herein to query virtual material appearance catalogs using a photo. Additionally, the returned virtual material appearances may include an indication on the similarity between a same feature of the retrieved virtual material appearance and the picture used as input. This indication may be a star system, such as the one shown in FIG. 19.

The invention claimed is:

1. A computer-implemented method for retrieving a similar virtual material appearance from a database, the method comprising:
 obtaining a database including virtual material appearances, each virtual material appearance being associated to an appearance signature computed from values representing at least one of a structure, a reflection and a color of the associated virtual material appearance;
 obtaining a first appearance signature associated to a first virtual material appearance; and
 identifying, in the database, one or more virtual material appearances similar to the first virtual material appearance by comparing the first appearance signature with appearance signatures respectively associated to virtual material appearances in the database.

2. The computer-implemented method of claim 1, wherein the values representing at least one of the structure, the reflection, and the color of the associated virtual material appearance are computed from a representation of the said associated virtual material appearance.

3. The computer-implemented method of claim 2, wherein computing the value of the color includes determining a value $\Delta E_{ab}$, given by:

$$\Delta E_{ab} = \sqrt{(L_2 - L_1)^2 + (a_2 - a_1)^2 + (b_2 - b_1)^2}$$

Where:
 1 and 2 correspond to indexes relative to two colors;
 L corresponds to Lightness; and
 a and b correspond to green-red, blue-yellow color components respectively.

4. The computer-implemented method of claim 2, further comprising computing the value of the reflection by computing a Bi-Directional Reflection Distribution Function (BRDF) from the representation of the associated virtual material appearance.

5. The computer-implemented method of claim 4, wherein computing the BRDF further comprises computing multiple angular evaluations of the BRDF on the representation of the associated virtual material appearance, in a parametrized space with an illumination having a spatially uniform neutral light.

6. The computer-implemented method of claim 5, wherein the illumination further includes a frequency component.

7. The computer-implemented method of claim 2, further comprising computing the value of the structure by:
 sampling a virtual measure plane of the representation of the associated virtual material appearance, with a lighting having spatially uniform neutral light; and
 evaluating a hemispherical integral of reflected light of the lighting by each sample.

8. The computer-implemented method of claim 1, further comprising weighting the first appearance signature.

9. The computer-implemented method of claim 8, wherein weighting the first appearance signature further comprises:
 weighting the values representing the at least one of the structure, the reflection and the color of the virtual material appearances associated to the first appearance signature and each compared appearance signature.

10. The computer-implemented method of claim 1, wherein computing an appearance signature further comprises reducing dimensions of the appearance signature.

11. The computer-implemented method of claim 10, wherein reducing the dimensions of the appearance signature further comprises:
 performing a principal component analysis (PCA) on values respectively representing at least one of structure, reflection and color of associated virtual material appearances of the database;
 obtaining a number of basis vectors resulting from the PCA; and
 reducing a number of computed values using the number of basis vectors.

12. The computer-implemented method of claim 11, wherein the first appearance signature is computed from a reduced number of values representing at least one of the structure, the reflection and the color of the first virtual material appearance.

13. A non-transitory computer readable medium having stored thereon a program comprising instructions that when executed by a computer causes the computer to implement a method of retrieving a similar virtual material appearance from a database, the method comprising:
 obtaining a database including virtual material appearances, each virtual material appearance being associated to an appearance signature computed from values representing at least one of a structure, a reflection and a color of the associated virtual material appearance;
 obtaining a first appearance signature associated to a first virtual material appearance; and
 identifying in the database one or more virtual material appearances similar to the first virtual material appearance by comparing the first appearance signature with appearance signatures respectively associated to virtual material appearances in the database.

14. A system comprising
 a database; and
 a processor coupled to a memory, the memory having recorded thereon a program for retrieving a similar virtual material appearance from a database that when executed by the processor causes the processor to be configured to obtain a database including virtual material appearances, each virtual material appearance being associated to an appearance signature computed from values representing at least one of a structure, a reflection and a color of the associated virtual material appearance;

obtain a first appearance signature associated to a first virtual material appearance; and identify in the database one or more virtual material appearances similar to the first virtual material appearance by comparing the first appearance signature with appearance signatures respectively associated to virtual material appearances in the database.

\* \* \* \* \*